US012695698B2

(12) United States Patent
Xiao et al.

(10) Patent No.: US 12,695,698 B2
(45) Date of Patent: Jul. 28, 2026

(54) PACKET PROCESSING METHOD AND NETWORK DEVICE

(71) Applicant: Huawei Technologies Co., Ltd., Shenzhen (CN)

(72) Inventors: Shihan Xiao, Beijing (CN); Bo Wu, Shenzhen (CN); Haibo Wang, Beijing (CN); Xiaofei Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 285 days.

(21) Appl. No.: 18/471,725

(22) Filed: Sep. 21, 2023

(65) Prior Publication Data

US 2024/0022512 A1 Jan. 18, 2024

Related U.S. Application Data

(63) Continuation of application No. PCT/CN2022/082138, filed on Mar. 22, 2022.

(30) Foreign Application Priority Data

Mar. 23, 2021 (CN) .......................... 202110309197.7

(51) Int. Cl.
*H04L 45/745* (2022.01)
*G06N 3/08* (2023.01)
*H04L 49/55* (2022.01)

(52) U.S. Cl.
CPC ............. *H04L 45/745* (2013.01); *G06N 3/08* (2013.01); *H04L 49/55* (2013.01)

(58) Field of Classification Search
CPC ....... H04L 45/745; H04L 49/55; H04L 41/16; H04L 41/0894; H04L 45/08; H04L 45/28;
(Continued)

(56) References Cited

U.S. PATENT DOCUMENTS 7,047,317 B1 * 5/2006 Huie ................. H04L 45/74591
711/140
9,942,161 B1 * 4/2018 Chen ................... H04L 47/2491
(Continued)

FOREIGN PATENT DOCUMENTS

CN 106209490 A * 12/2016 ............. H04L 43/08
CN 106549872 A * 3/2017 ......... H04L 45/7453
(Continued)

OTHER PUBLICATIONS

The Law of Attraction: Affinity-Aware Placement Optimization using Graph Neural Networks, Yi-Chen Lu, 2021 (Year: 2021).*
(Continued)

*Primary Examiner* — Michael A Keller
(74) *Attorney, Agent, or Firm* — Conley Rose, P.C.

(57) ABSTRACT

In a packet processing method, a network device obtains a first packet. The network device determines a first index value based on address information of the first packet and a neural network model. The network device determines, from an action information table based on the first index value, action information corresponding to the first packet, where the action information table includes at least one entry, and each entry corresponds to an index value and a piece of action information. The network device processes the first packet based on the action information corresponding to the first packet.

20 Claims, 14 Drawing Sheets

(58) Field of Classification Search

CPC ........... H04L 45/48; H04L 47/32; G06N 3/08; G06N 3/0499; G06N 3/09; G06N 3/04

See application file for complete search history.

(56) References Cited

U.S. PATENT DOCUMENTS

| | | | | |
|---|---|---|---|---|
| 11,258,707 | B1 * | 2/2022 | Pudiyapura | ......... H04L 49/9068 |
| 11,863,445 | B1 * | 1/2024 | Shen | ...................... H04L 45/50 |
| 2008/0232347 | A1 * | 9/2008 | Chao | ....................... H04L 45/50 370/351 |
| 2013/0034096 | A1 * | 2/2013 | Hu | .......................... H04L 45/54 370/389 |
| 2015/0188808 | A1 * | 7/2015 | Ghanwani | .......... H04L 41/0663 709/244 |
| 2016/0254999 | A1 * | 9/2016 | Labonte | ................. H04L 47/17 370/392 |
| 2017/0031335 | A1 * | 2/2017 | Sakakibara | .......... G05B 19/042 |
| 2019/0372895 | A1 * | 12/2019 | Parthasarathy | ....... H04L 63/101 |
| 2019/0372896 | A1 * | 12/2019 | Hasani | ................ H04L 45/7453 |
| 2020/0412635 | A1 * | 12/2020 | Jha | .......................... H04L 45/64 |
| 2021/0336883 | A1 * | 10/2021 | Pudiyapura | ......... H04L 47/2441 |

FOREIGN PATENT DOCUMENTS

| | | | | | |
|---|---|---|---|---|---|
| CN | 110096458 | A | * | 8/2019 | ........... G06F 12/121 |
| CN | 110109616 | A | * | 8/2019 | ............. G06N 3/084 |
| CN | 110196938 | A | * | 9/2019 | ........... G06F 16/951 |
| CN | 107762677 | B | * | 5/2020 | ......... F02D 41/0027 |
| CN | 111385209 | A | | 7/2020 | |
| WO | 2019031839 | A1 | | 2/2019 | |
| WO | WO-2020015682 | A1 | * | 1/2020 | ............. G05D 1/101 |

OTHER PUBLICATIONS

Realtime query completion via deep language models, Po-Wei Wang, 2018 (Year: 2018).*

Evolution of tree data structures for indexing: more exciting than it sounds, Dmitry Dolgov, 2020 (Year: 2020).*

Leonce Mekinda et al:"Supervised Machine Learning-based Routing for Named Data Networking." Dec. 4, 2016. total 6 pages.

Gabor Retvari, et al:"Compressing IP Forwarding Tables: Towards Entrophy Bounds and Beyond," Published: Feb. 1, 2016, 12 pages.

Tim Kraska, et al. The Case for Learned Index Structures, Research 6: Storage & Indexing, SIGMOD'18, Jun. 10-15, 2018, Houston, TX, USA, 16 pages.

* cited by examiner

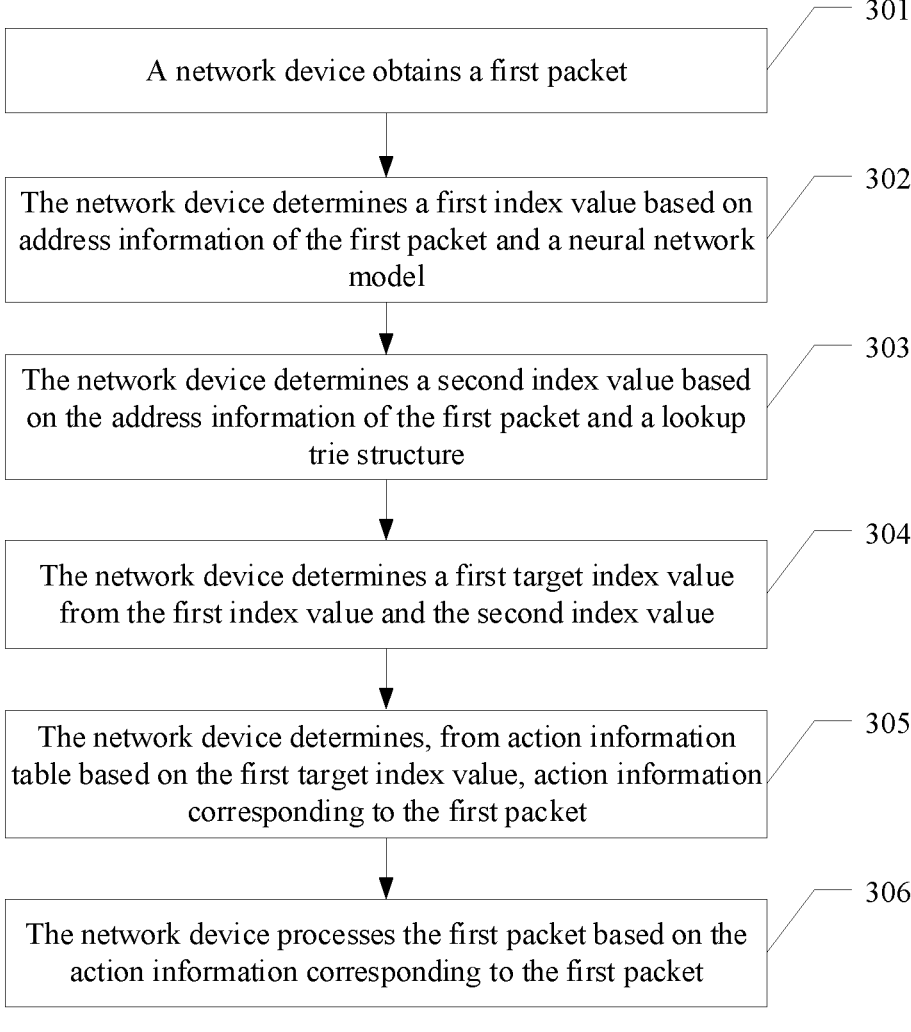

A network device obtains a first packet — 301

The network device determines a first index value based on address information of the first packet and a neural network model — 302

The network device determines a second index value based on the address information of the first packet and a lookup trie structure — 303

The network device determines a first target index value from the first index value and the second index value — 304

The network device determines, from action information table based on the first target index value, action information corresponding to the first packet — 305

The network device processes the first packet based on the action information corresponding to the first packet — 306

FIG. 3A

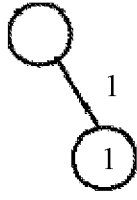

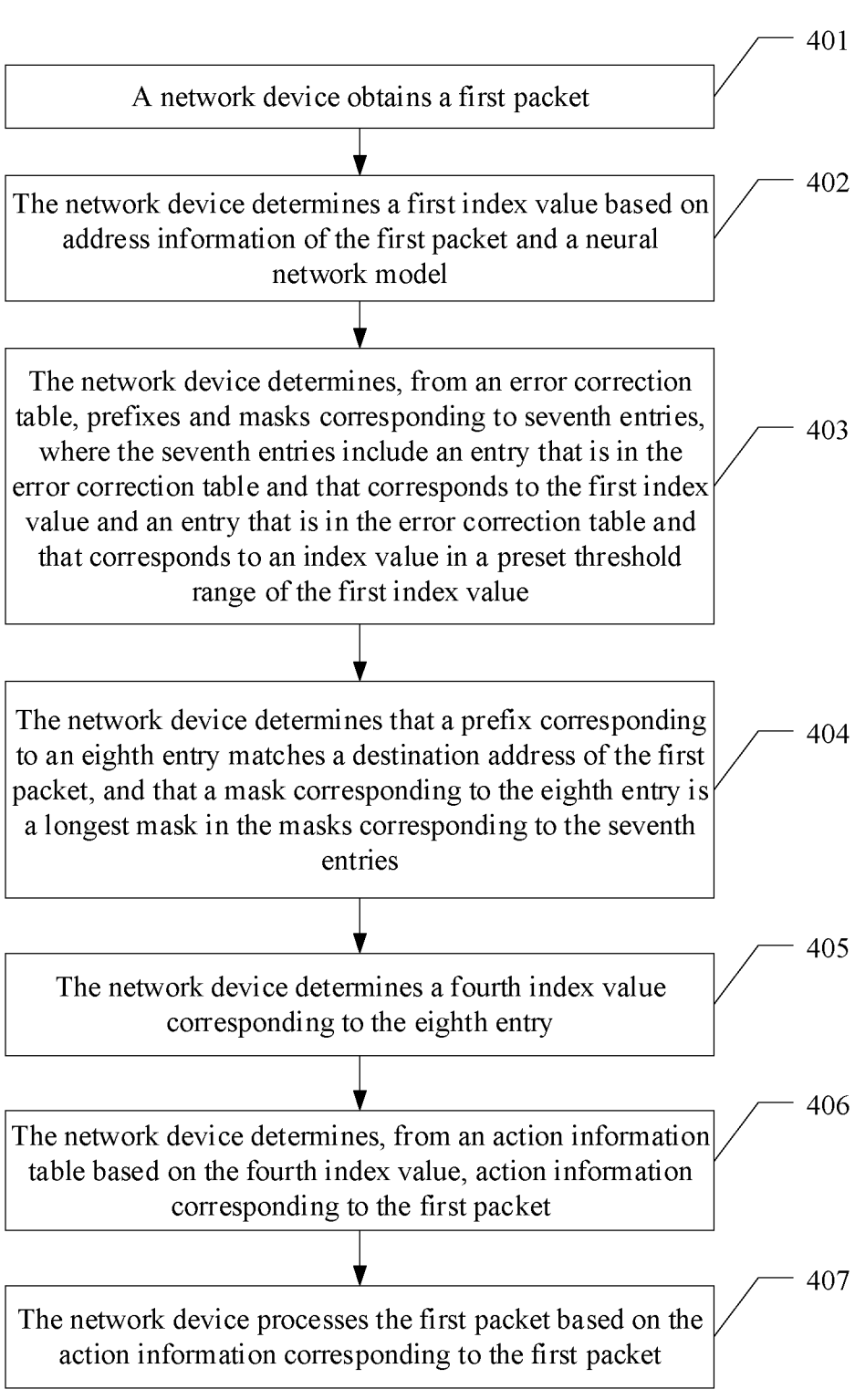

401

A network device obtains a first packet

402

The network device determines a first index value based on address information of the first packet and a neural network model

403

The network device determines, from an error correction table, prefixes and masks corresponding to seventh entries, where the seventh entries include an entry that is in the error correction table and that corresponds to the first index value and an entry that is in the error correction table and that corresponds to an index value in a preset threshold range of the first index value

404

The network device determines that a prefix corresponding to an eighth entry matches a destination address of the first packet, and that a mask corresponding to the eighth entry is a longest mask in the masks corresponding to the seventh entries

405

The network device determines a fourth index value corresponding to the eighth entry

406

The network device determines, from an action information table based on the fourth index value, action information corresponding to the first packet

407

The network device processes the first packet based on the action information corresponding to the first packet

FIG. 4A

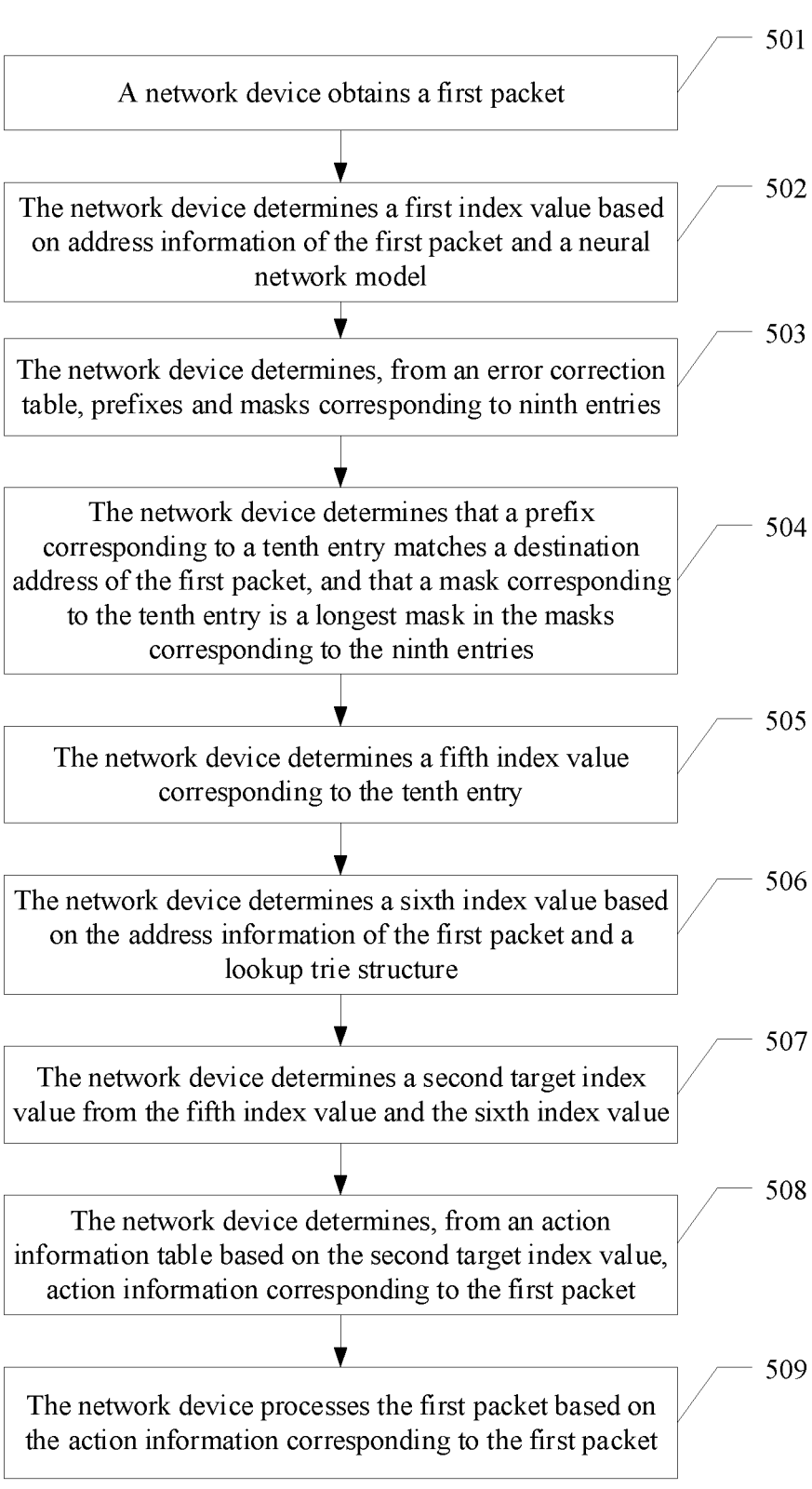

A network device obtains a first packet — 501

The network device determines a first index value based on address information of the first packet and a neural network model — 502

The network device determines, from an error correction table, prefixes and masks corresponding to ninth entries — 503

The network device determines that a prefix corresponding to a tenth entry matches a destination address of the first packet, and that a mask corresponding to the tenth entry is a longest mask in the masks corresponding to the ninth entries — 504

The network device determines a fifth index value corresponding to the tenth entry — 505

The network device determines a sixth index value based on the address information of the first packet and a lookup trie structure — 506

The network device determines a second target index value from the fifth index value and the sixth index value — 507

The network device determines, from an action information table based on the second target index value, action information corresponding to the first packet — 508

The network device processes the first packet based on the action information corresponding to the first packet — 509

FIG. 5A

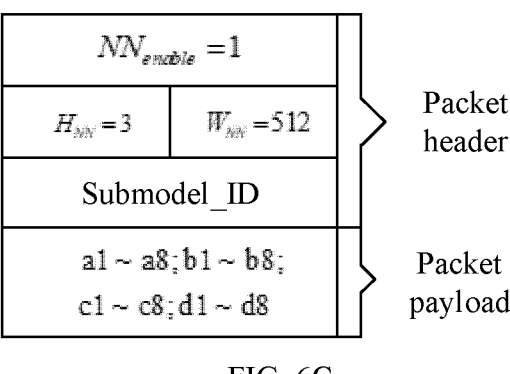
FIG. 6C
A network device determines an entry that is in a packet rule information table and that cannot be fitted by using a neural network model ⸺ 701
The network device represents, based on a lookup trie algorithm, the entry that cannot be fitted by using the neural network model, to obtain a lookup trie structure ⸺ 702
FIG. 7A
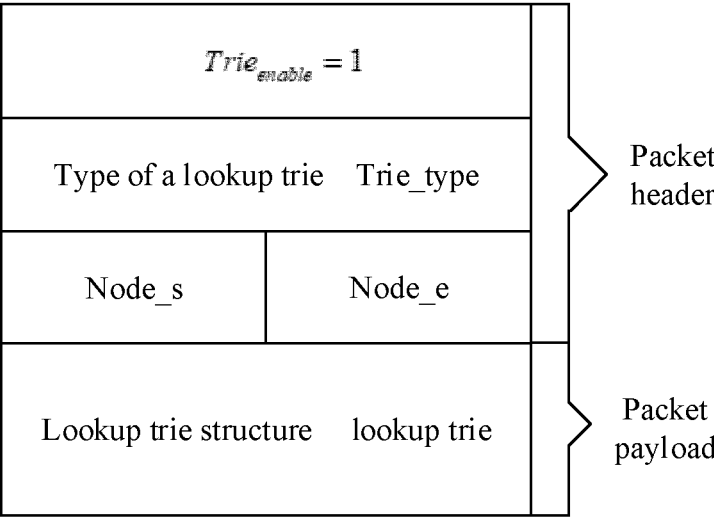
FIG. 7B

PACKET PROCESSING METHOD AND NETWORK DEVICE

CROSS-REFERENCE TO RELATED APPLICATIONS

This application is a continuation application of International Patent Application No. PCT/CN2022/082138 filed on Mar. 22, 2022, which claims priority to Chinese Patent Application No. 202110309197.7 filed on Mar. 23, 2021. The disclosures of the aforementioned applications are hereby incorporated by reference in their entireties.

TECHNICAL FIELD

This application relates to network technologies, and in particular, to a packet processing method and a network device.

BACKGROUND

A table lookup function is one of the most important core functions of a network. An efficient table lookup can effectively improve packet processing efficiency of the network. A forwarding information base (FIB) table is used as an example. The FIB table includes a FIB entry. A FIB entry lookup algorithm is mainly a trie lookup algorithm. For a given FIB table, a lookup trie structure may be constructed based on a prefix included in each entry in the FIB table. A network device stores a lookup trie structure, and implements a table lookup function by using the lookup trie structure. A storage size of the lookup trie structure stored in the network device is mainly determined by a size of the lookup trie structure. A lookup speed at which the network device performs a table lookup by using the lookup trie structure is mainly determined by a height of the lookup trie structure.

However, as a quantity of FIB entries included in the FIB table increases, the lookup trie structure that is in the network device and that is used to look up a FIB entry generates more storage overheads in the network device, resulting in high storage overheads.

SUMMARY

Embodiments of this application provide a packet processing method and a network device, to reduce storage overheads and increase a speed of determining action information corresponding to a first packet. Therefore, a packet processing delay is reduced.

A first aspect of embodiments of this application provides a packet processing method. The method includes the following.

The network device obtains a first packet. Then, the network device determines a first index value based on address information of the first packet and a neural network model. The network device determines, from an action information table based on the first index value, action information corresponding to the first packet, where the action information table includes at least one entry, and each entry corresponds to an index value and a piece of action information. The network device processes the first packet based on the action information corresponding to the first packet.

In this embodiment, the network device determines the first index value based on the address information of the first packet and the neural network model. Then, the network device determines, from the action information table based on the first index value, the action information corresponding to the first packet, and processes the first packet. The network device does not need to store a large-scale lookup trie structure, which avoids storage overheads caused by the lookup trie structure. In addition, compared with a manner in which the network device determines, by using the lookup trie structure, the action information corresponding to the first packet, a manner in which the network device determines, by using the neural network model and the action information table, the action information corresponding to the first packet is faster and has a shorter lookup delay.

In a possible implementation, the method further includes the following. The network device determines a second index value based on the address information of the first packet and a lookup trie structure, where the lookup trie structure is a lookup trie structure corresponding to an entry that is in a packet rule information table and that cannot be fitted by using the neural network model. The network device determines a first target index value from the first index value and the second index value. That the network device determines, from an action information table based on the first index value, action information corresponding to the first packet includes the following. The network device determines, from the action information table based on the first target index value, the action information corresponding to the first packet.

In this possible implementation, in general, 90 percent (%) of entries in the packet rule information table may be fitted by using the neural network model, and a small quantity of entries in the packet rule information table cannot be fitted. Therefore, the network device only needs to store a lookup trie structure corresponding to the entries that cannot be fitted by using the neural network model. The technical solution in this implementation can compress an existing large-scale lookup trie structure, reduce storage overheads of the lookup trie structure in the network device, and effectively enhance a forwarding capacity. In addition, compared with a manner in which the network device determines an index value by using the large-scale lookup trie structure, a manner in which the network device determines the first index value based on the address information of the first packet and the neural network model is faster and has a shorter lookup delay.

In another possible implementation, the neural network model is obtained by performing model training based on the packet rule information table.

In this possible implementation, the neural network model is obtained by performing model training based on the packet rule information table. In this way, the network device may determine the index value by using the neural network model without storing the lookup trie structure. Therefore, storage overheads are reduced.

In another possible implementation, the packet rule information table includes at least one entry, each entry corresponds to an index value and a piece of action information, and the action information table is used to indicate action information corresponding to each entry in the packet rule information table.

In this possible implementation, an association relationship between the packet rule information table and the action information table is shown.

In another possible implementation, a first entry in the packet rule information table corresponds to a second entry in the action information table, the first entry and the second entry each include one or more entries, an index value corresponding to the first entry is the same as an index value corresponding to the second entry, and the index value corresponding to the second entry includes the first index value.

In this possible implementation, the first entry in the packet rule information table corresponds to the second entry in the action information table, the first entry and the second entry each include one or more entries, and the index value corresponding to the first entry is the same as the index value corresponding to the second entry. Therefore, no index value conversion needs to be performed, which avoids corresponding processing overheads and overheads of storing a conversion relationship.

In another possible implementation, that the network device determines a first index value based on address information of the first packet and a neural network model includes the following. The network device determines a third index value based on the address information of the first packet and the neural network model, where the third index value is an index value corresponding to a third entry in the packet rule information table. The network device determines, from a mapping table based on the third index value, the first index value corresponding to a fourth entry in the action information table, where the fourth entry is an entry that is in the action information table and that corresponds to the third entry, and the mapping table includes an index value of an entry that is in the action information table and that corresponds to each entry in the packet rule information table.

In this possible implementation, the network device determines the third index value based on the address information of the first packet and the neural network model. The network device determines, from the mapping table based on the third index value, the first index value corresponding to the fourth entry in the action information table, to determine the action information corresponding to the first packet.

In another possible implementation, that the network device determines a first target index value from the first index value and the second index value includes the following. The network device determines a mask length corresponding to the first index value and a mask length corresponding to the second index value. The network device selects the first index value as the first target index value if the mask length corresponding to the first index value is longer than the mask length corresponding to the second index value. Alternatively, the network device selects the second index value as the first target index value if the mask length corresponding to the first index value is shorter than the mask length corresponding to the second index value.

In this possible implementation, a specific manner of selecting the first target index value is provided. The first target index value is selected based on a mask length corresponding to an index value, so that the first target index value is selected by using a principle of matching performed based on a longest prefix. In this way, the corresponding action information for the first packet is determined more accurately.

In another possible implementation, that the network device determines a first target index value from the first index value and the second index value includes the following. The network device determines that the first index value corresponds to a fifth entry in an error correction table and that the second index value corresponds to a sixth entry in the error correction table. The error correction table includes at least one entry, each entry corresponds to an index value and a priority, and entries in the error correction table are in a one-to-one correspondence with entries in the packet rule information table in order of index values. Each entry in the packet rule information table corresponds to a priority, and a priority corresponding to each entry in the error correction table is the same as a priority of a corresponding entry in the packet rule information table. The network device determines, based on the error correction table, a priority corresponding to the fifth entry and a priority corresponding to the sixth entry.

The network device selects the first index value as the first target index value if the priority corresponding to the fifth entry is higher than the priority corresponding to the sixth entry. Alternatively, the network device selects the second index value as the first target index value if the priority corresponding to the fifth entry is lower than the priority corresponding to the sixth entry.

This possible implementation provides another possible implementation in which the network device determines the first target index value. The first target index value is determined based on a priority of an entry corresponding to an index value, so that corresponding action information for the first packet can be accurately determined.

In another possible implementation, the method further includes the following. The network device determines, from an error correction table, prefixes and masks corresponding to seventh entries. The error correction table includes at least one entry, each entry corresponds to an index value and has corresponding address information, the address information corresponding to each entry includes a prefix and a mask, and the seventh entries include an entry that is in the error correction table and that corresponds to the first index value and an entry that is in the error correction table and that corresponds to an index value in a preset threshold range of the first index value. The network device determines that a prefix corresponding to an eighth entry in the seventh entries matches a destination address of the first packet, where a mask corresponding to the eighth entry is a longest mask in the masks corresponding to the seventh entries. The network device determines a fourth index value corresponding to the eighth entry. That the network device determines, from an action information table based on the first index value, action information corresponding to the first packet includes the following. The network device determines, from the action information table based on the fourth index value, the action information corresponding to the first packet.

In this possible implementation, the network device determines the first index value based on the address information of the first packet and the neural network model. Then, the network device performs error correction on the first index value based on the error correction table, to obtain the fourth index value. The network device determines, from the action information table based on the fourth index value, the action information corresponding to the first packet, and processes the first packet based on the action information corresponding to the first packet. It can be learned that the network device does not need to store a large-scale lookup trie structure, which avoids storage overheads caused by the lookup trie structure. Compared with a manner in which the network device determines, by using the lookup trie structure, the action information corresponding to the first packet, a manner in which the network device determines, by using the neural network model, the error correction table, and the action information table, the action information corresponding to the first packet is faster and has a shorter lookup delay. Further, the network device performs error correction on the first index value based on the error correction table to obtain the fourth index value, and then determines the action information corresponding to the first packet. In this way, corresponding action information for the first packet can be determined more accurately.

In another possible implementation, the method further includes the following. The network device determines, from an error correction table, prefixes and masks corresponding to ninth entries. The error correction table includes at least one entry, each entry corresponds to an index value and has corresponding address information, the address information corresponding to each entry includes a prefix and a mask, and the ninth entries include an entry that is in the error correction table and that corresponds to the first index value and an entry that is in the error correction table and that corresponds to an index value in a preset threshold range of the first index value. The network device determines that a prefix corresponding to a tenth entry in the ninth entries matches a destination address of the first packet, where a mask corresponding to the tenth entry is a longest mask in the masks corresponding to the ninth entries. The network device determines a fifth index value corresponding to the tenth entry. The network device determines a sixth index value based on the address information of the first packet and a lookup trie structure, where the lookup trie structure is a lookup trie structure corresponding to an entry that is in a packet rule information table and that cannot be fitted by using the neural network model. The network device determines a second target index value from the fifth index value and the sixth index value. That the network device determines, from an action information table based on the first index value, action information corresponding to the first packet includes the following. The network device determines, from the action information table based on the second target index value, the action information corresponding to the first packet.

In this possible implementation, the lookup trie structure is a lookup trie structure corresponding to the entry that cannot be fitted by using the neural network model. Therefore, the technical solution in this implementation can compress an existing large-scale lookup trie structure, reduce storage overheads of the lookup trie structure in the network device, and effectively enhance a forwarding capacity. Compared with a manner in which the network device determines an index value by using the large-scale lookup trie structure, a manner in which the network device determines a fourth index value by using the neural network model, the error correction table, and the action information table is faster and has a shorter lookup delay. In addition, the network device may further perform error correction on the first index value based on the error correction table, to obtain the fifth index value. Then, with reference to the fifth index value and the sixth index value, the network device determines the action information corresponding to the first packet. In this way, the action information for the first packet is determined more accurately.

In another possible implementation, the action information corresponding to the first packet includes port information. That the network device processes the first packet based on the action information corresponding to the first packet includes the following. The network device determines a next-hop routing node of the first packet based on the port information, and the network device forwards the first packet to the next-hop routing node.

This implementation provides a specific process applied to a forwarding scenario in this application. The network device determines the port information, and then forwards the first packet based on the port information.

In another possible implementation, before the network device determines a first index value based on address information of the first packet and a neural network model, the method further includes the following. The network device determines a neural network structure. The network device performs training based on the packet rule information table and the neural network structure, to obtain the neural network model, where the packet rule information table includes at least one entry, each entry corresponds to an index value and a piece of action information, and the action information table is used to indicate the action information corresponding to each entry in the packet rule information table.

In this possible implementation, a process of obtaining the neural network model by the network device through training is provided, to provide a basis for implementing the solution. The network device performs model training by using the packet rule information table and the neural network structure. In this way, the network device may subsequently determine an index value based on the address information of the packet and the neural network model without storing the packet rule information table and a corresponding lookup trie structure. Therefore, corresponding storage overheads are avoided.

In another possible implementation, the method further includes the following. A control plane of the network device sends a first message to a data plane of the network device, where the first message is used to deliver or update the neural network model to the data plane of the network device.

In this possible implementation, after obtaining the neural network model through training, the control plane of the network device may deliver the neural network model to the data plane of the network device. In this way, after receiving a packet, the data plane of the network device may determine a corresponding index value by using the neural network model and the address information of the packet.

In another possible implementation, the first message includes a second packet. A packet header of the second packet includes an enable bit for the neural network model, a height of the neural network model, a width of the neural network model, and an identifier of a micromodel in the neural network model, where the enable bit for the neural network model takes a value of 1. A payload of the second packet includes a parameter of the neural network model.

In this possible implementation, the control plane of the network device may deliver a related parameter of the neural network model to the data plane of the network device through a packet. This implementation provides a specific format in which the packet carries the related parameter of the neural network model.

In another possible implementation, the method further includes the following. The network device determines the entry that is in the packet rule information table and that cannot be fitted by using the neural network model, where the packet rule information table includes at least one entry, each entry corresponds to an index value and a piece of action information, and the action information table is used to indicate the action information corresponding to each entry in the packet rule information table. The network device represents, based on a lookup trie algorithm, the entry that cannot be fitted by using the neural network model, to obtain the lookup trie structure.

In this possible implementation, the network device may represent, based on the lookup trie algorithm, the entry that cannot be fitted by using the neural network model, to obtain the lookup trie structure. In general, 90% of the entries in the packet rule information table may be fitted by using the neural network model, and a small quantity of entries in the packet rule information table cannot be fitted. Therefore, the network device only needs to store a lookup trie structure corresponding to the entries that cannot be fitted by using the neural network model. Therefore, the technical solution in this implementation compresses an existing large-scale lookup trie structure, reduces storage overheads of the lookup trie structure in the network device, and effectively enhances a forwarding capacity. In addition, the network device determines a final target index value by combining the neural network model with the lookup trie structure. In this way, the action information corresponding to the packet can be determined more accurately.

In another possible implementation, the method further includes the following. The control plane of the network device sends a second message to the data plane of the network device, where the second message is used to deliver or update the lookup trie structure to the data plane of the network device.

In this possible implementation, after determining the lookup trie structure, the control plane of the network device may deliver the lookup trie structure to the data plane of the network device. In this way, after receiving the packet, the data plane of the network device may determine a corresponding index value by using the lookup trie structure and the address information of the packet.

In another possible implementation, the second message includes a third packet. A packet header of the third packet includes an enable bit for the lookup trie, a type of the lookup trie structure, an identifier of a start node to be updated in the lookup trie structure, and an identifier of an end node to be updated in the lookup trie structure, where the enable bit for the lookup trie takes a value of 1. A payload of the third packet includes the lookup trie structure.

In this possible implementation, the control plane of the network device may deliver the lookup trie structure to the data plane of the network device through a packet. This implementation provides a specific format in which a packet carries the lookup trie structure.

In another possible implementation, the method further includes the following. The control plane of the network device sends a third message to the data plane of the network device, where the third message is used to deliver or update the error correction table to the data plane of the network device.

In this possible implementation, the control plane of the network device delivers the error correction table to the data plane of the network device. In this way, the data plane of the network device may perform error correction on an index value obtained by using the neural network model, to obtain a final index value. Therefore, corresponding action information for the packet is determined more accurately.

In another possible implementation, the third message includes a fourth packet. A packet header of the fourth packet includes an enable bit for the error correction table, and a start position and an end position for to-be-updated entries in the error correction table, where the enable bit for the error correction table takes a value of 1. A payload of the fourth packet includes prefixes and masks corresponding to the to-be-updated entries.

In this possible implementation, the control plane of the network device may deliver the error correction table to the data plane of the network device through a packet. This implementation provides a specific format in which a packet carries the error correction table.

A second aspect of embodiments of this application provides a network device, where the network device includes a transceiver module configured to obtain a first packet, and a processing module configured to determine a first index value based on address information of the first packet and a neural network model, determine, from an action information table based on the first index value, action information corresponding to the first packet, where the action information table includes at least one entry, and each entry corresponds to an index value and a piece of action information, and process the first packet based on the action information corresponding to the first packet.

In a possible implementation, the processing module is further configured to determine a second index value based on the address information of the first packet and a lookup trie structure, where the lookup trie structure is a lookup trie structure corresponding to an entry that is in a packet rule information table and that cannot be fitted by using the neural network model, and determine a first target index value from the first index value and the second index value, and the processing module is further configured to determine, from the action information table based on the first target index value, the action information corresponding to the first packet.

In another possible implementation, the neural network model is obtained by performing model training based on the packet rule information table.

In another possible implementation, the packet rule information table includes at least one entry, each entry corresponds to an index value and a piece of action information, and the action information table is used to indicate action information corresponding to each entry in the packet rule information table.

In another possible implementation, a first entry in the packet rule information table corresponds to a second entry in the action information table, the first entry and the second entry each include one or more entries, an index value corresponding to the first entry is the same as an index value corresponding to the second entry, and the index value corresponding to the second entry includes the first index value.

In another possible implementation, the processing module is further configured to determine a third index value based on the address information of the first packet and the neural network model, where the third index value is an index value corresponding to a third entry in the packet rule information table, and determine, from a mapping table based on the third index value, the first index value corresponding to a fourth entry in the action information table, where the fourth entry is an entry that is in the action information table and that corresponds to the third entry, and the mapping table includes an index value of an entry that is in the action information table and that corresponds to each entry in the packet rule information table.

In another possible implementation, the processing module is further configured to determine a mask length corresponding to the first index value and a mask length corresponding to the second index value, and select the first index value as the first target index value if the mask length corresponding to the first index value is longer than the mask length corresponding to the second index value, or select the second index value as the first target index value if the mask length corresponding to the first index value is shorter than the mask length corresponding to the second index value.

In another possible implementation, the processing module is further configured to determine that the first index value corresponds to a fifth entry in an error correction table and that the second index value corresponds to a sixth entry in the error correction table, where the error correction table includes at least one entry, each entry corresponds to an index value and a priority, and entries in the error correction table are in a one-to-one correspondence with entries in the packet rule information table in order of index values, and each entry in the packet rule information table corresponds to a priority, and a priority corresponding to each entry in the error correction table is the same as a priority of a corresponding entry in the packet rule information table, determine, based on the error correction table, a priority corresponding to the fifth entry and a priority corresponding to the sixth entry, and select the first index value as the first target index value if the priority corresponding to the fifth entry is higher than the priority corresponding to the sixth entry, or select the second index value as the first target index value if the priority corresponding to the fifth entry is lower than the priority corresponding to the sixth entry.

In another possible implementation, the processing module is further configured to determine, from an error correction table, prefixes and masks corresponding to seventh entries, where the error correction table includes at least one entry, each entry corresponds to an index value and has corresponding address information, the address information corresponding to each entry includes a prefix and a mask, and the seventh entries include an entry that is in the error correction table and that corresponds to the first index value and an entry that is in the error correction table and that corresponds to an index value in a preset threshold range of the first index value, determine that a prefix corresponding to an eighth entry in the seventh entries matches a destination address of the first packet, where a mask corresponding to the eighth entry is a longest mask in the masks corresponding to the seventh entries, and determine a fourth index value corresponding to the eighth entry.

The processing module is further configured to determine, from the action information table based on the fourth index value, the action information corresponding to the first packet.

In another possible implementation, the processing module is further configured to determine, from an error correction table, prefixes and masks corresponding to ninth entries, where the error correction table includes at least one entry, each entry corresponds to an index value and has corresponding address information, the address information corresponding to each entry includes a prefix and a mask, and the ninth entries include an entry that is in the error correction table and that corresponds to the first index value and an entry that is in the error correction table and that corresponds to an index value in a preset threshold range of the first index value, determine that a prefix corresponding to a tenth entry in the ninth entries matches a destination address of the first packet, where a mask corresponding to the tenth entry is a longest mask in the masks corresponding to the ninth entries, determine a fifth index value corresponding to the tenth entry, determine a sixth index value based on the address information of the first packet and a lookup trie structure, where the lookup trie structure is a lookup trie structure corresponding to an entry that is in a packet rule information table and that cannot be fitted by using the neural network model, and determine a second target index value from the fifth index value and the sixth index value.

The processing module is further configured to determine, from the action information table based on the second target index value, the action information corresponding to the first packet.

In another possible implementation, the action information corresponding to the first packet includes port information, and the processing module is further configured to determine a next-hop routing node of the first packet based on the port information, and forward the first packet to the next-hop routing node.

In another possible implementation, the processing module is further configured to determine a neural network structure, and perform training based on the packet rule information table and the neural network structure, to obtain the neural network model, where the packet rule information table includes at least one entry, each entry corresponds to an index value and a piece of action information, and the action information table is used to indicate the action information corresponding to each entry in the packet rule information table.

In another possible implementation, a control plane of the network device sends a first message to a data plane of the network device, where the first message is used to deliver or update the neural network model to the data plane of the network device.

In another possible implementation, the first message includes a second packet. A packet header of the second packet includes an enable bit for the neural network model, a height of the neural network model, a width of the neural network model, and an identifier of a micromodel in the neural network model, where the enable bit for the neural network model takes a value of 1. A payload of the second packet includes a parameter of the neural network model.

In another possible implementation, the processing module is further configured to determine the entry that is in the packet rule information table and that cannot be fitted by using the neural network model, where the packet rule information table includes at least one entry, each entry corresponds to an index value and a piece of action information, and the action information table is used to indicate the action information corresponding to each entry in the packet rule information table, and represent, based on a lookup trie algorithm, the entry that cannot be fitted by using the neural network model, to obtain the lookup trie structure.

In another possible implementation, the control plane of the network device sends a second message to the data plane of the network device, where the second message is used to deliver or update the lookup trie structure to the data plane of the network device.

In another possible implementation, the second message includes a third packet. A packet header of the third packet includes an enable bit for the lookup trie, a type of the lookup trie structure, an identifier of a start node to be updated in the lookup trie structure, and an identifier of an end node to be updated in the lookup trie structure, where the enable bit for the lookup trie takes a value of 1. A payload of the third packet includes the lookup trie structure.

In another possible implementation, the control plane of the network device sends a third message to the data plane of the network device, where the third message is used to deliver or update the error correction table to the data plane of the network device.

In another possible implementation, the third message includes a fourth packet. A packet header of the fourth packet includes an enable bit for the error correction table, and a start position and an end position for to-be-updated entries in the error correction table, where the enable bit for the error correction table takes a value of 1. A payload of the fourth packet includes prefixes and masks corresponding to the to-be-updated entries.

A third aspect of embodiments of this application provides a network device. The network device includes a processor configured to perform the method according to any one of the possible implementations of the first aspect.

Optionally, the network device may further include a memory. The memory is configured to store instructions. When the instructions stored in the memory are executed by the processor, the method according to any one of the possible implementations of the first aspect may be performed.

Optionally, the network device further includes a communication interface, and the communication interface is used by the network device to communicate with another device. For example, the communication interface may be a transceiver, a circuit, a bus, a module, a pin, or a communication interface of another type.

A fourth aspect of embodiments of this application provides a computer-readable storage medium. The computer-readable storage medium stores computer instructions. When the computer instructions are run on a computer, the computer is enabled to perform the method according to any one of the possible implementations of the first aspect.

A fifth aspect of embodiments of this application provides a computer program product. The computer program product includes computer program code. When the computer program code is run on a computer, the computer is enabled to perform the method according to any one of the possible implementations of the first aspect.

A seventh aspect of embodiments of this application provides a chip, including a processor. The processor is configured to perform the method according to any one of the possible implementations of the first aspect.

Optionally, the chip further includes a memory, where the memory is coupled to the processor.

Optionally, the chip further includes a communication interface.

It can be learned from the foregoing technical solution that embodiments of this application have the following advantages.

It can be learned from the foregoing technical solution that the network device obtains the first packet. Then, the network device determines the first index value based on the address information of the first packet and the neural network model. The network device determines, from the action information table based on the first index value, the action information corresponding to the first packet, where the action information table includes at least one entry, and each entry corresponds to an index value and a piece of action information. The network device processes the first packet based on the action information corresponding to the first packet. Therefore, in this application, the first index value is determined based on the neural network model and the address information of the first packet, and the action information corresponding to the first packet is determined from the action information table based on the first index value, so as to process the first packet. The network device does not need to store a large-scale lookup trie structure, which avoids storage overheads caused by the lookup trie structure.

BRIEF DESCRIPTION OF DRAWINGS

FIG. 3A is a schematic diagram of another embodiment of a packet processing method according to an embodiment of this application;

FIG. 3B is a schematic diagram of a lookup trie structure according to an embodiment of this application;

FIG. 4A is a schematic diagram of another embodiment of a packet processing method according to an embodiment of this application;

FIG. 5A is a schematic diagram of another embodiment of a packet processing method according to an embodiment of this application;

FIG. 6C is a schematic diagram of a format of a second packet according to an embodiment of this application;

FIG. 7A is a schematic diagram of another embodiment of a packet processing method according to an embodiment of this application;

FIG. 7B is a schematic diagram of a format of a third packet according to an embodiment of this application;

DESCRIPTION OF EMBODIMENTS

Embodiments of this application provide a packet processing method and a network device, to reduce storage overheads and increase a speed of determining action information corresponding to a first packet. Therefore, a packet processing delay is reduced.

The technical solution in this application is applicable to various data communication network scenarios, such as a data center network, a wide area network, a local area network, a metropolitan area network, and a mobile communication network. A data communication network system to which this application is applicable includes at least one network device. The network device may be a router, a switch, or the like. The network device may use the technical solution provided in this application to process a packet received by the network device.

The following explains some technical terms in this application.

1. Action information: The action information includes a processing operation indication for a packet, and/or some related processing information for performing a processing operation on the packet, such as information of a discard operation and port information. The action information is used to process the packet.

2. Packet rule information table: The packet rule information table includes at least one entry, and each entry corresponds to an index value, a piece of packet rule information, and a piece of action information. The packet rule information may be address information, port information, protocol number information, or the like of a packet. The packet rule information table is used to match packet information of the packet with the packet rule information in the packet rule information table to determine action information corresponding to the packet or an index value of the action information corresponding to the packet.

3. Action information table: The action information table includes at least one entry, and each entry corresponds to an index value and a piece of action information. The action information table is used to determine action information corresponding to a packet by using an index value.

4. Lookup trie structure: The lookup trie structure consists of nodes and edges. Each node stores a corresponding value. The value may be an index value or indicate action information.

5. Neural network model: The neural network model is a network system formed by interconnected neurons. In this application, the neural network model is obtained by performing model training based on an entry in the packet rule information table.

Figure 1:
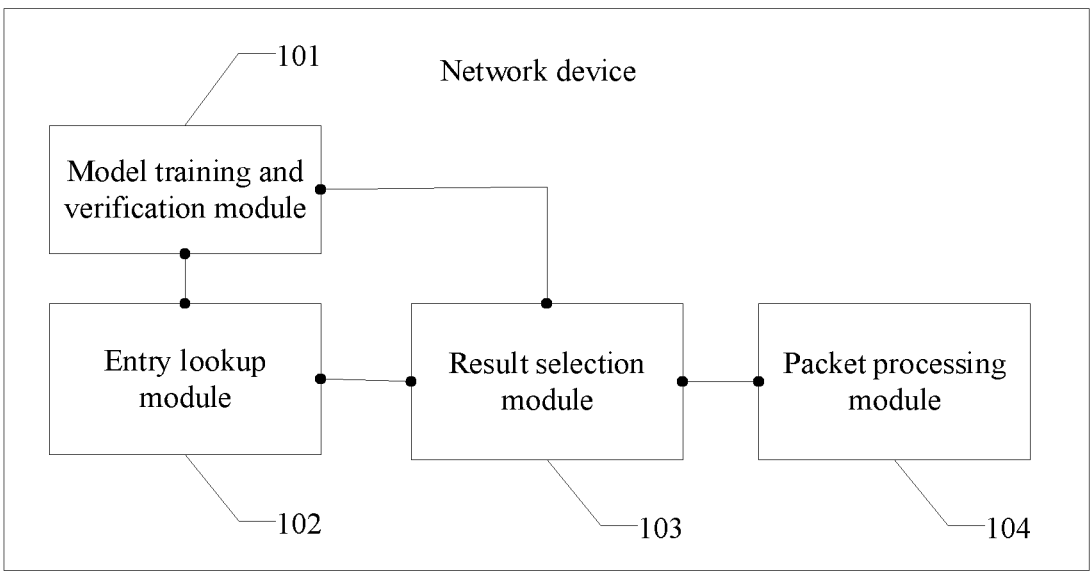
FIG. 1 is a schematic diagram of a structure of a network device according to an embodiment of this application.

With reference to FIG. 1, the following describes a schematic diagram of a structure of a network device according to an embodiment of this application.

Refer to FIG. 1. FIG. 1 is a schematic diagram of a structure of a network device according to an embodiment of this application. In FIG. 1, the network device includes a model training and verification module 101, an entry lookup module 102, a result selection module 103, and a packet processing module 104.

The model training and verification module 101 is configured to perform model training based on a packet rule information table to obtain a neural network model, and send the neural network model to the entry lookup module 102.

The packet rule information table includes at least one entry, and each entry corresponds to an index value and a piece of action information. Each entry has corresponding address information.

In this embodiment of this application, the packet rule information table may be a FIB table, or an access control list (ACL), or a firewall policy table, or a flow table, or a media access control (MAC) address table. This is not limited in this application. For more descriptions of the packet rule information table, refer to related descriptions of the embodiment shown in FIG. 2A below.

Optionally, the model training and verification module 101 is further configured to determine an entry that cannot be fitted by using the neural network model, represent, as a lookup trie structure by using a lookup trie algorithm, the entry that cannot be fitted by using the neural network model, and send the lookup trie structure to the entry lookup module 102.

The entry lookup module 102 is configured to receive the neural network model sent by the model training and verification module 101, and calculate a first index value based on address information of a first packet and the neural network model.

The result selection module 103 is configured to determine, from an action information table based on the first index value, action information corresponding to the first packet.

The action information table includes at least one entry, and each entry corresponds to an index value and a piece of action information. The action information table is used to indicate action information corresponding to each entry in the packet rule information table.

The packet processing module 104 is configured to process the first packet based on the action information corresponding to the packet.

Optionally, the entry lookup module 102 is further configured to calculate a second index value based on the address information of the first packet and the lookup trie structure.

The lookup trie structure is a lookup trie structure corresponding to the entry that is in the packet rule information table and that cannot be fitted by using the neural network model.

In this implementation, the result selection module 103 is further configured to determine a first target index value from the first index value and the second index value, and determine, from the action information table based on the first target index value, the action information corresponding to the first packet. The packet processing module 104 is configured to process the first packet based on the action information corresponding to the first packet.

Optionally, the entry lookup module 102 is further configured to perform error correction on the first index value based on an error correction table, to obtain a seventh index value.

The error correction table includes at least one entry, and each entry corresponds to an index value and has corresponding address information. The address information of each entry in the error correction table is obtained from the packet rule information table. For more descriptions of the error correction table, refer to related descriptions below.

In this implementation, the result selection module 103 is configured to select a third target index value from the seventh index value and the second index value, and determine, from the action information table based on the third target index value, the action information corresponding to the first packet.

The following describes the technical solution in embodiments of this application with reference to specific embodiments.

Figure 2A:
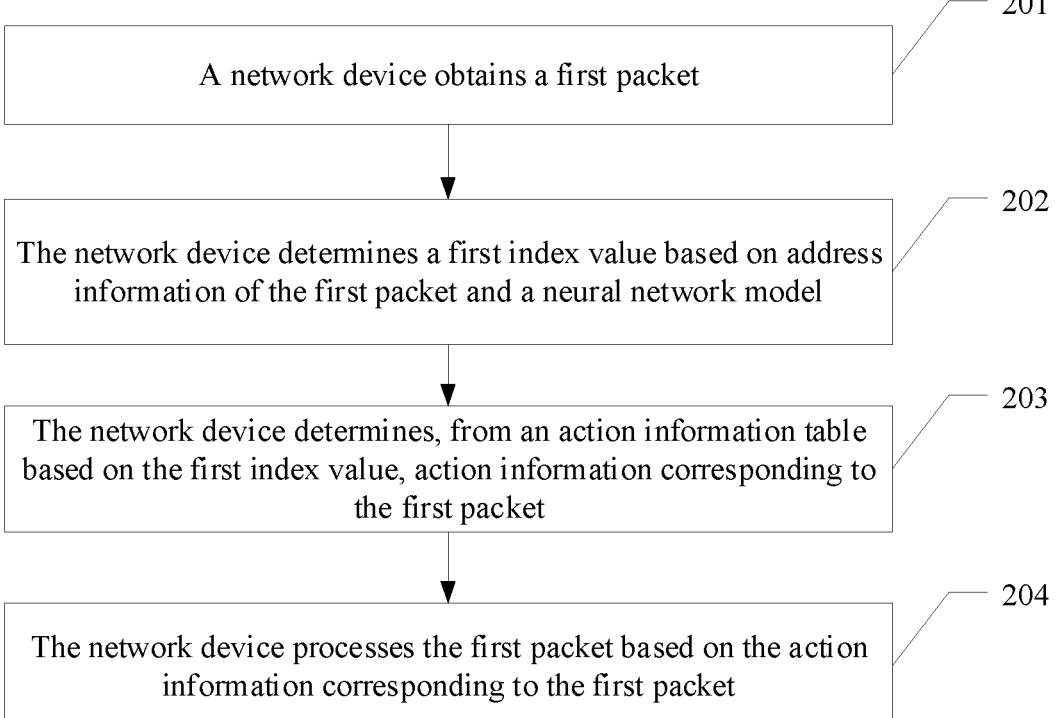
FIG. 2A is a schematic diagram of an embodiment of a packet processing method according to an embodiment of this application.

Refer to FIG. 2A. FIG. 2A is a schematic diagram of an embodiment of a packet processing method according to an embodiment of this application. In FIG. 2A, the packet processing method includes the following steps.

201: A network device obtains a first packet.

Further, the first packet reaches the network device, and a data plane of the network device may extract address information of the first packet, such as a destination address or a source address of the first packet.

202: The network device determines a first index value based on the address information of the first packet and a neural network model.

In this embodiment, the address information of the first packet includes at least one of the following: the destination address of the first packet and the source address of the first packet.

The neural network model is a neural network model obtained by performing model training based on a packet rule information table.

The packet rule information table includes at least one entry, each entry corresponds to an index value and a piece of action information, and each entry has corresponding address information.

Optionally, the address information corresponding to each entry includes a prefix, a mask, and the like. The piece of action information corresponding to each entry includes port information and the like.

device to determine an egress port of the packet, and forward the packet from the egress port to a next-hop routing node. For example, in the foregoing Table 1, the 2nd entry corresponds to a prefix of 0, a mask of /1, and an egress port of 3.

For example, as shown in Table 2, the packet rule information table is the ACL. The ACL contains six rows, and each row may be considered as an entry. Therefore, Table 2 includes six entries. It can be learned from Table 2 that each ACL entry in the ACL has corresponding 5-tuple information. The 5-tuple information includes source address information, destination address information, source port information, destination port information, and protocol number information. In addition, each ACL entry has a priority.

TABLE 2

| Source address information | Destination address information | Source port information | Destination port information | Protocol number information |
|---|---|---|---|---|
| 156.225.120.30/32 | 13.56.195.105/32 | 0:65535 | 6789:6789 | 0x06 |
| 156.226.207.75/32 | 13.56.195.105/32 | 0:65535 | 1705:1705 | 0x06 |
| 156.228.58.152/32 | 13.56.195.105/32 | 0:65535 | 1525:1525 | 0x06 |
| 156.229.10.28/32 | 13.56.195.105/32 | 0:65535 | 1521:1521 | 0x06 |
| 156.231.43.50/32 | 13.56.195.105/32 | 0:65535 | 1707:1707 | 0x06 |
| 156.233.89.23/32 | 13.56.195.105/32 | 0:65535 | 1521:1521 | 0x06 |

It should be noted that the piece of action information corresponding to each entry may include action information for different network layers.

For example, the piece of action information corresponding to each entry includes a port number, an index value of a destination MAC address, and the like. Further, at an IP layer, the network device forwards the first packet based on the port number. At a MAC layer, the network device determines the destination MAC address based on the index value of the destination MAC address, and modifies a MAC address of the first packet to the destination MAC address.

In this embodiment, the packet rule information table includes any one of the following: a FIB table, an ACL, a MAC address table, a firewall policy table, and a flow table.

For example, as shown in Table 1, the packet rule information table is the FIB table. The FIB table includes six rows, and each row may be considered as an entry. Therefore, Table 1 includes six entries. A 1st entry corresponds to an index value 0, and a 2nd entry corresponds to an index value 1. By analogy, a 6th entry corresponds to an index value 5.

TABLE 1

| Prefix prefix | Label |
|---|---|
| —/0 | 2 |
| 0/1 | 3 |
| 00/2 | 3 |
| 001/3 | 2 |
| 01/2 | 2 |
| 011/3 | 1 |

It can be learned from Table 1 that each FIB entry in the FIB table corresponds to a prefix, a mask, and port information. In an example, address information corresponding to each entry includes a prefix and a mask, and a piece of action information corresponding to each entry includes port information. The port information indicates the network Further, the address information of the first packet includes the destination address of the first packet. In step 202, the network device inputs the destination address of the first packet into the neural network model as an input parameter, to obtain the first index value output by the neural network model.

It should be noted that the neural network model in the network device may be sent to the network device by another device, may be preconfigured in the network device, or may be obtained by the network device through self-training. This is not limited in this application. For an implementation in which the network device obtains the neural network model through self-training, refer to related descriptions of the embodiment shown in FIG. 6 below. Details are not described herein.

In this embodiment, it should be noted that, if the neural network model returns no result in step 202, it indicates that the destination address of the first packet does not match any prefix in the packet rule information table. In this case, the network device may process the first packet by performing a default action. For example, the network device discards the first packet. Alternatively, the network device forwards the first packet from a default port to a next-hop routing node.

203: The network device determines, from an action information table based on the first index value, action information corresponding to the first packet.

The action information table includes at least one entry, and each entry corresponds to an index value and a piece of action information. The action information table is used to indicate action information corresponding to each entry in the packet rule information table.

In a first possible implementation, first entries in the packet rule information table are in a one-to-one correspondence with second entries in the action information table, and index values corresponding to the first entries are respectively the same as index values corresponding to the second entries.

The first entry and the second entry each include one or more entries. The index value corresponding to the second entry includes the first index value.

For example, the packet rule information table is the FIB table shown in Table 1, and the action information table may be represented as the following Table 3. It can be learned from Table 1 and Table 3 that the 1st entry in Table 1 corresponds to a 2nd entry in Table 3. It can be learned from Table 1 and Table 3 that the 1st entry in the packet rule information table corresponds to a 1st entry in the action information table, the 2nd entry in the packet rule information table corresponds to a 2nd entry in the action information table, and so on. It can be learned from Table 1 that the packet rule information table includes six entries, where the 1st entry corresponds to the index value 0, and the 2nd entry corresponds to the index value 1. By analogy, the 6th entry corresponds to the index value 5. It can be learned from Table 3 that the action information table includes six entries, where the 1st entry corresponds to the index value 0, and the 2nd entry corresponds to the index value 1. By analogy, a 6th entry corresponds to the index value 5. Therefore, the first entry includes the 1st entry to the 6th entry in the packet rule information table. The second entry includes the 1st entry to the 6th entry in the action information table. The index values corresponding to the first entry are respectively the same as the index values corresponding to the second entry.

TABLE 3

| Label |
|-------|
| 2 |
| 3 |
| 3 |
| 2 |
| 2 |
| 1 |

It can be learned that the first index value output by the network device through the neural network model in step 202 may be understood as an index value of a corresponding entry in the action information table. Therefore, no index value conversion needs to be performed. In step 203, the network device determines, from the action information table, an entry corresponding to the first index value, and uses action information corresponding to the entry as the action information corresponding to the first packet.

In this implementation, optionally, a quantity of entries included in the packet rule information table is the same as a quantity of entries included in the action information table, and the entries in the packet rule information table are in a one-to-one correspondence with the entries in the action information table in order of index values. For example, it can be learned from Table 1 and Table 3 that a quantity of entries included in Table 3 is the same as a quantity of entries included in Table 1. The entries in Table 3 may be in a one-to-one correspondence with the entries in Table 1. For example, the first index value determined in step 202 is the index value 0. Then, it can be learned that the index value 0 corresponds to the 1st entry in Table 1. The 1st entry in Table 1 corresponds to the 1st entry in Table 3. Therefore, the first index value may be understood as an index value of the 1st entry in Table 3. Then, the network device may perform step 203. Port information corresponding to an entry in the action information table is port information of an entry that is in Table 1 and that corresponds to the entry in the action information table.

For example, the first index value is the index value 1. The entries in the packet rule information table are in a one-to-one correspondence with the entries in the action information table in order of index values. In other words, index values corresponding to the entries in the packet rule information table are the same as index values corresponding to corresponding entries in the action information table. Therefore, the network device may determine, based on Table 3, that the index value 1 corresponds to the 2nd entry, and port information in the 2nd entry includes a port 2. Therefore, the network device may determine to forward the first packet through the port 2.

The following describes a second possible implementation with reference to steps 203a and 203b.

203a: The network device determines a third index value based on the address information of the first packet and the neural network model.

The third index value is an index value corresponding to a third entry in the packet rule information table.

For example, the packet rule information table is Table 1, and the third index value is an index value 2 corresponding to a 3rd entry in Table 1.

Step 203b: The network device determines, from a mapping table based on the third index value, the first index value corresponding to a fourth entry in the action information table.

The fourth entry is an entry that is in the action information table and that corresponds to the third entry. The mapping table includes an index value of an entry that is in the action information table and that corresponds to each entry in the packet rule information table.

Optionally, the quantity of entries included in the action information table differs from the quantity of entries included in the packet rule information table. For example, there is a many-to-one relationship between the entries in the action information table and the entries in the packet rule information table.

For example, the packet rule information table is Table 1, and the action information table is Table 4.

TABLE 4

| Label |
|-------|
| 2 |
| 3 |
| 1 |

In an example, the action information table includes only three entries, and each entry corresponds to an index value. It can be learned from Table 4 that, it may be understood that each egress port corresponds to an index value. A port 2 corresponds to an index value 0, a port 3 corresponds to an index value 1, and a port 1 corresponds to an index value 2. Entries in which ports are the same in Table 2 are deleted. This can reduce the quantity of entries in the action information table and reduce storage overheads.

Table 1 and Table 4 are used as an example. In this case, the mapping table may include an index value of an entry that is in the action information table and that corresponds to each entry in the packet rule information table. Further, as shown in Table 5, Table 5 is a schematic diagram of a mapping table.

An egress port in the 1st entry shown in Table 1 is numbered 2, and an egress port in a 1st entry shown in Table 4 is numbered 2. Therefore, the 1st entry shown in Table 1 corresponds to the 1st entry shown in Table 4. An index value corresponding to the 1st entry in Table 4 is 0. Therefore, an index value in a first row in the mapping table in Table 5 is 0.

An egress port in the 2nd entry shown in Table 1 is numbered 3, and an egress port in a 2nd entry shown in Table 4 is numbered 3. Therefore, the 2nd entry shown in Table 1 corresponds to the 2nd entry shown in Table 4. An index value corresponding to the 2nd entry in Table 4 is 1. Therefore, an index value of a second row in the mapping table in Table 5 is 1.

An egress port in the 3rd entry shown in Table 1 is numbered 3, and the egress port in the 2nd entry shown in Table 4 is numbered 3. Therefore, the 3rd entry shown in Table 1 corresponds to the 2nd entry shown in Table 4. The index value corresponding to the 2nd entry in Table 4 is 1. Therefore, an index value of a third row in the mapping table in Table 5 is 1. By analogy, the 6th entry shown in Table 1 corresponds to a 3rd entry shown in Table 4. An index value corresponding to the 3rd entry in Table 4 is 2. Therefore, an index value of a sixth row in the mapping table in the following Table 5 is 2.

TABLE 5

| Index value |
| --- |
| 0 |
| 1 |
| 1 |
| 0 |
| 0 |
| 2 |

An index value of each entry in Table 5 is an index value of an entry that is in Table 4 and that corresponds to an entry in Table 1.

For example, the third index value is the index value 2 corresponding to the 3rd entry in Table 1. In this case, the network device determines, based on Table 5, that the 3rd entry in Table 1 corresponds to the index value 1 of the 2nd entry in Table 4. Therefore, the first index value is the index value 1.

In the following embodiments, the technical solution of this application is described by using an example in which the entries in the packet rule information table are in a one-to-one correspondence with the entries in the action information table in order of index values.

204: The network device processes the first packet based on the action information corresponding to the first packet.

In a possible implementation, the action information includes port information. Step 204 further includes steps 204a and 204b.

204a: The network device determines a next-hop routing node of the first packet based on the port information.

For example, as shown in Table 3, the port information indicates the port 2. In this case, a routing node connected to the port 2 of the network device is the next-hop routing node of the first packet.

204b: The network device forwards the first packet to the next-hop routing node.

For example, the port information indicates the port 2. The network device forwards the first packet to the next-hop routing node through the port 2 of the network device.

In another possible implementation, the action information indicates discard processing. In this case, step 204 includes that the network device discards the first packet.

Figure 2B:
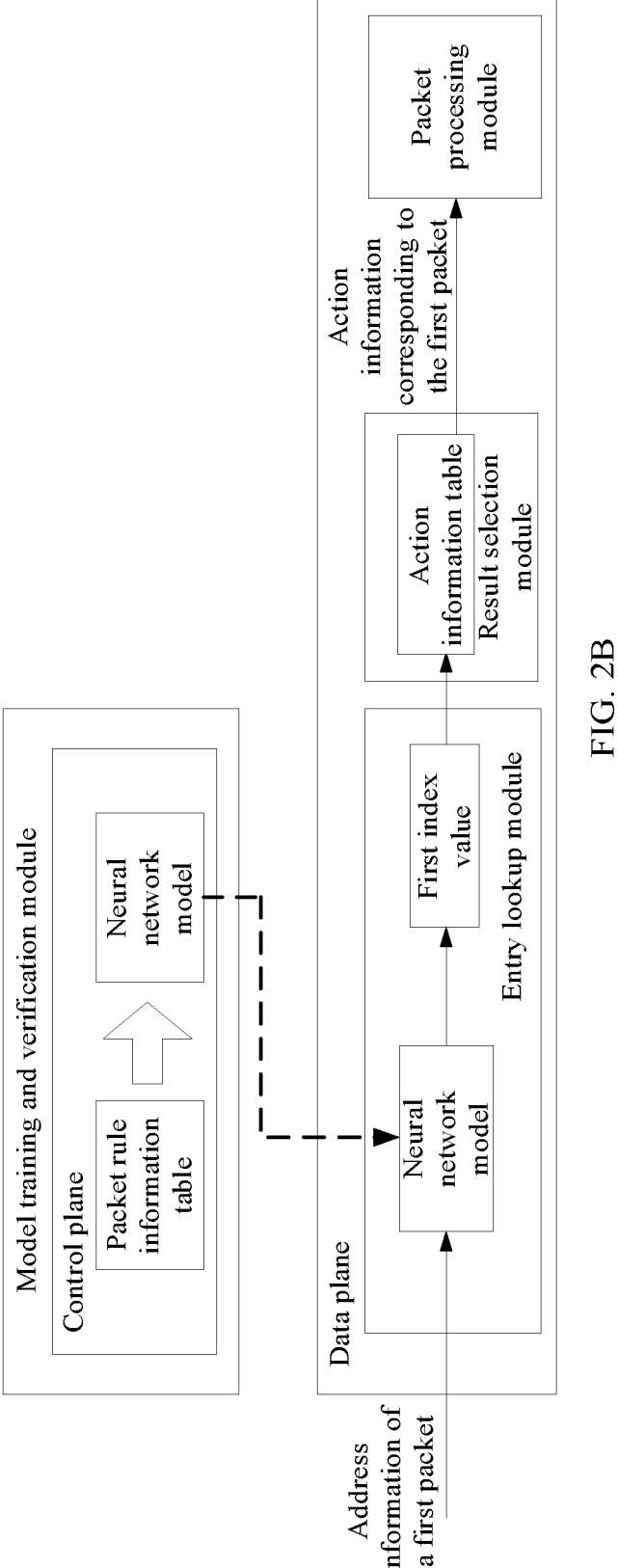
FIG. 2B is a schematic diagram of a scenario of a packet processing method according to an embodiment of this application.

Based on the first implementation in step 203, the following describes a specific process of this embodiment with reference to FIG. 2B. As shown in FIG. 2B, a model training and verification module in the network device performs model training based on the packet rule information table, to obtain the neural network model. An entry lookup module in the network device receives the first packet, and inputs the address information of the first packet into the neural network model, to obtain the first index value. Then, a result selection module in the network device determines, from the action information table based on the first index value, the action information corresponding to the first packet. A packet processing module in the network device processes the first packet based on the action information corresponding to the first packet.

Figure 2C:
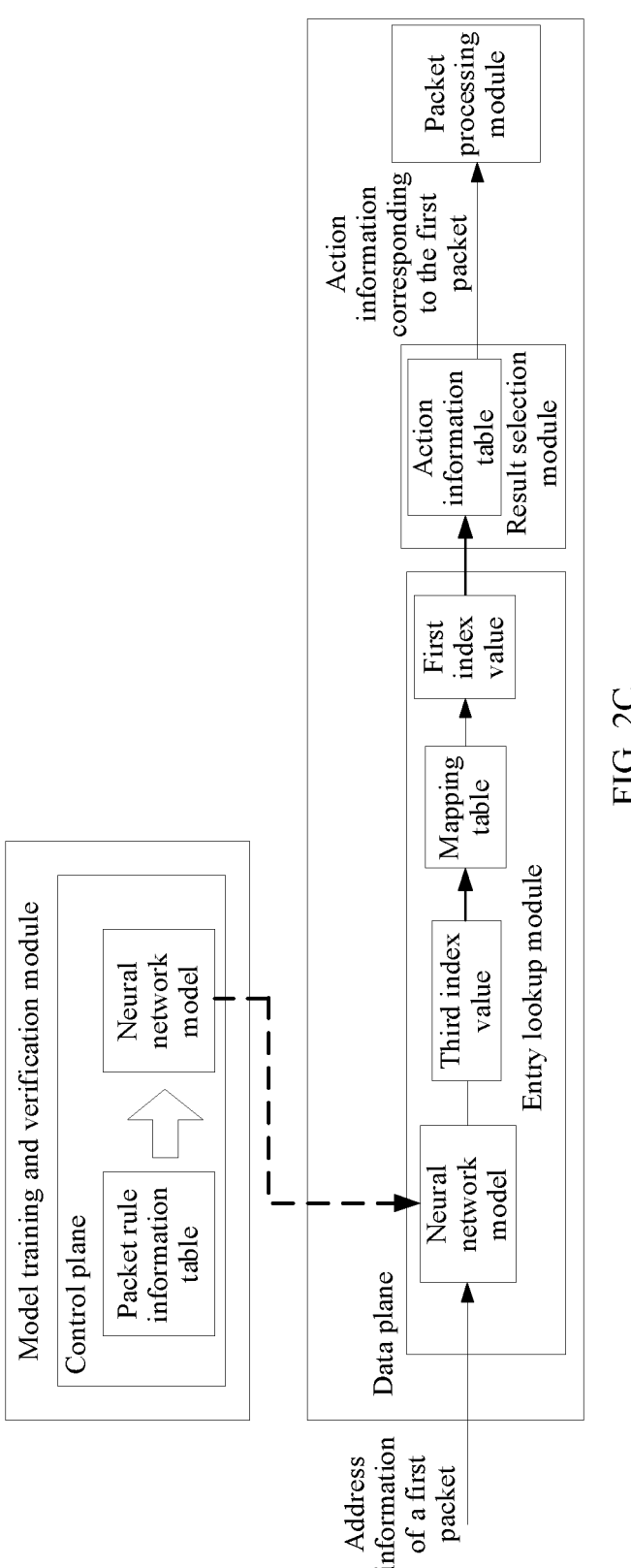
FIG. 2C is a schematic diagram of another scenario of a packet processing method according to an embodiment of this application.

Based on the second implementation in step 203, the following describes a specific process of this embodiment with reference to FIG. 2C. As shown in FIG. 2C, a process performed by the network device is similar to a related description of FIG. 2B. A difference lies in: after the entry lookup module in the network device obtains the third index value, the entry lookup module determines, from the mapping table based on the third index value, the first index value corresponding to a corresponding entry in the action information table. The result selection module in the network device determines, from the action information table based on the first index value, the action information corresponding to the first packet. Then, the packet processing module in the network device processes the first packet based on the action information corresponding to the first packet.

Figure 2D:
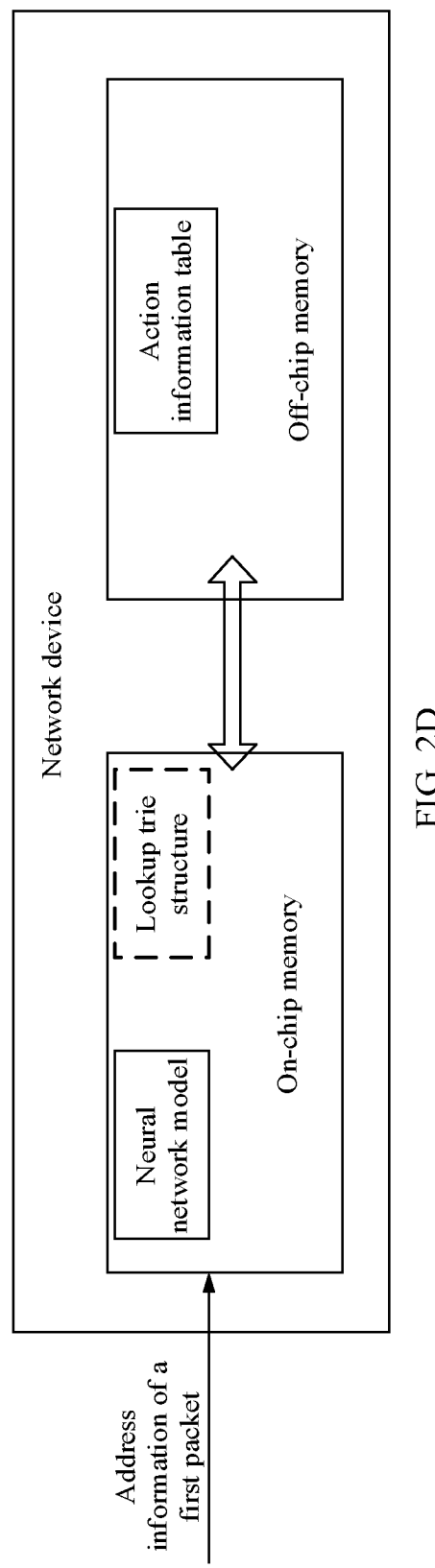
FIG. 2D is a schematic diagram of storage of a neural network model, a lookup trie structure, and an action information table in a network device according to an embodiment of this application.

In this embodiment of this application, the network device may determine the first index value based on the neural network model and the address information of the first packet. The network device determines, from the action information table based on the first index value, the action information corresponding to the first packet, and processes the first packet based on the action information corresponding to the first packet. The network device does not need to store a large-scale lookup trie structure, which avoids storage overheads caused by the lookup trie structure. In addition, compared with a manner in which the network device determines, by using the lookup trie structure, the action information corresponding to the first packet, a manner in which the network device determines, by using the neural network model and the action information table, the action information corresponding to the first packet is faster and has a shorter lookup delay. Further, as shown in FIG. 2D, the neural network model in the network device may be stored in a chip, and the action information table in the network device may be stored outside the chip. In this way, when processing the first packet, the network device only needs to access an on-chip memory, and does not need to access an off-chip memory. This reduces bandwidth for accessing the off-chip memory, and effectively enhances a forwarding capacity.

In this embodiment of this application, optionally, an entry may be unable to be fitted when the neural network model is used to fit entries included in packet rule information. This application provides a corresponding technical solution to resolve an issue in which an entry in the packet rule information table cannot be fitted by using the neural network model. The following provides detailed descriptions with reference to an embodiment shown in FIG. 3A.

Refer to FIG. 3A. FIG. 3A is a schematic diagram of another embodiment of a packet processing method according to an embodiment of this application. In FIG. 3A, the packet processing method includes the following steps.

301: A network device obtains a first packet.

302: The network device determines a first index value based on address information of the first packet and a neural network model.

Steps 301 and 302 are similar to steps 201 and 202 in the embodiment shown in FIG. 2A. For details, refer to related descriptions of steps 201 and 202 in the embodiment shown in FIG. 2A. The details are not described herein.

303: The network device determines a second index value based on the address information of the first packet and a lookup trie structure.

The lookup trie structure is a lookup trie structure corresponding to an entry that is in a packet rule information table and that cannot be fitted by using the neural network model. For example, the packet rule information table is a FIB table shown in Table 6.

TABLE 6

| Prefix prefix | Label |
|---|---|
| —/0 | 2 |
| 1/1 | 2 |
| 0/1 | 3 |
| 00/2 | 3 |
| 001/3 | 2 |
| 01/2 | 2 |
| 011/3 | 1 |

The neural network model in step 302 may be expressed as y=x+3, where x represents destination address information with a length of 3 bits, and y represents an index value. The entry that cannot be fitted by using the neural network model is a prefix starting with a binary 1. For example, an index value of an entry corresponding to a prefix-mask combination 1/1 is 1. However, a predicted index value predicted by using the foregoing neural network model is 4. In this case, the prefix-mask combination 1/1 and the index value 1 corresponding to prefix-mask combination 1/1 are added to a residual table, and are represented as a lookup trie structure by using a lookup trie algorithm. For details, refer to a lookup trie structure shown in FIG. 3B. If first three high-order bits in a destination address of the first packet are represented as 1, a lookup is performed from a right branch of the lookup trie structure shown in FIG. 3B**. Then, it can be learned that a number 1 on a found node represents an index value. In an example, the second index value is the index value 1.

In this embodiment, the lookup trie structure in step 303 may be sent to the network device by another device. Alternatively, the network device constructs the residual table for the entry that cannot be fitted by using the neural network model, and then represents, by using the lookup trie algorithm, the entry that is in the residual table and that cannot be fitted, to obtain the lookup trie structure. For a process of determining the lookup trie structure, refer to related descriptions below. Details are not described herein.

304: The network device determines a first target index value from the first index value and the second index value.

In step 304, the network device determines the first target index value in a plurality of manners. The following describes two possible manners.

The following describes a first possible manner with reference to steps 304a to 304c.

304a: The network device determines a mask length corresponding to the first index value and a mask length corresponding to the second index value.

Optionally, in step 304a, the network device may determine, in the following two possible implementations, the mask length corresponding to the first index value and the mask length corresponding to the second index value.

Implementation 1: The network device determines, from an error correction table, the mask length corresponding to the first index value and the mask length corresponding to the second index value.

The error correction table includes at least one entry. Each entry corresponds to an index value and has corresponding address information. The address information corresponding to each entry includes a prefix and a mask.

A quantity of entries included in the error correction table is the same as a quantity of entries included in the packet rule information table. In an example, the entries in the error correction table are in a one-to-one correspondence with the entries in the packet rule information table in order of index values. In other words, it may be understood that index values corresponding to the entries in the error correction table are the same as index values of corresponding entries in the packet information table. Address information corresponding to the entries in the error correction table is address information of the corresponding entries in the packet rule information table.

The error correction table and an action information table may be logically one table. In actual storage, content of the error correction table and content of the action information table may be stored in one table. This is not limited in this application.

For example, the packet rule information table is Table 6. The entries in the error correction table are in a one-to-one correspondence with the entries in the packet rule information table in order of index values. The address information corresponding to the entries in the error correction table is the address information of the corresponding entries in the packet rule information table. Therefore, the error correction table may be represented as the following Table 7.

TABLE 7

| Prefix prefix |
|---|
| —/0 |
| 1/1 |
| 0/1 |
| 00/2 |
| 001/3 |
| 01/2 |
| 011/3 |

For example, the first index value is an index value 3, and the second index value is an index value 1. It can be learned from Table 7 that the index value 3 corresponds to a 4th entry in Table 7, and the index value 1 corresponds to a 2nd entry in Table 7. It can be learned from Table 7 that the 2nd entry corresponds to a mask /1, that is, a mask length of 1. The 4th entry corresponds to a mask /2, that is, a mask length of 2.

Implementation 2: The network device obtains, in step 302, a mask length corresponding to the first index value output by the neural network model, and obtains, in step 303 by using the lookup trie structure, a mask length corresponding to the second index value.

304b: If the mask length corresponding to the first index value is longer than the mask length corresponding to the second index value, the network device selects the first index value as the first target index value.

304c: If the mask length corresponding to the first index value is shorter than the mask length corresponding to the second index value, the network device selects the second index value as the first target index value.

For example, as shown in Table 7, a 2nd entry that is in Table 7 and that corresponds to the first index value corresponds to a mask/1, that is, a mask length of 1. A 4th entry that is in Table 7 and that corresponds to the second index value corresponds to a mask/2, that is, a mask length of 2. In this case, the network device selects the second index value as the first target index value.

The manner described in steps 304a to 304c is generally used in a forwarding scenario. In other words, the packet rule information table is a FIB table.

The following describes a second possible manner with reference to steps 304d to 304g.

304d: The network device determines that the first index value corresponds to a fifth entry in an error correction table and that the second index value corresponds to a sixth entry in the error correction table.

For a related description of the error correction table, refer to a related description in step 304a. In step 304d, each entry in the error correction table further corresponds to a priority. Each entry in the packet rule information table corresponds to a priority. The priority corresponding to each entry in the error correction table is the same as a priority of a corresponding entry in the packet rule information table.

304e: The network device determines a priority corresponding to the fifth entry and a priority corresponding to the sixth entry.

For example, the packet rule information table is an ACL, and each entry in the packet rule information table has a corresponding priority. The entries in the error correction table are in a one-to-one correspondence with the entries in the packet rule information table in order of index values. Therefore, each entry in the error correction table has a corresponding priority, and the priority corresponding to each entry in the error correction table is the same as a priority of a corresponding entry in the packet rule information table. Therefore, the network device may determine, based on the error correction table, the priority corresponding to the fifth entry and the priority corresponding to the sixth entry.

It should be noted that the priority corresponding to each entry in the error correction table may be preconfigured by a user, or may be determined by the network device. This is not limited in this application.

304f: If the priority corresponding to the fifth entry is higher than the priority corresponding to the sixth entry, the network device selects the first index value as the first target index value.

304g: If the priority corresponding to the fifth entry is lower than the priority corresponding to the sixth entry, the network device selects the second index value as the first target index value.

It should be noted that an execution sequence of steps 302 and 303 in the embodiment shown in FIG. 3A is not limited. Step 302 may be performed before step 303. Alternatively, step 303 may be performed before step 302. Alternatively, steps 302 and 303 are performed in parallel. This is not limited in this application.

The manner described in steps 304d to 304g is generally used in an access control scenario. In other words, the packet rule information table is an ACL.

Figure 3C:
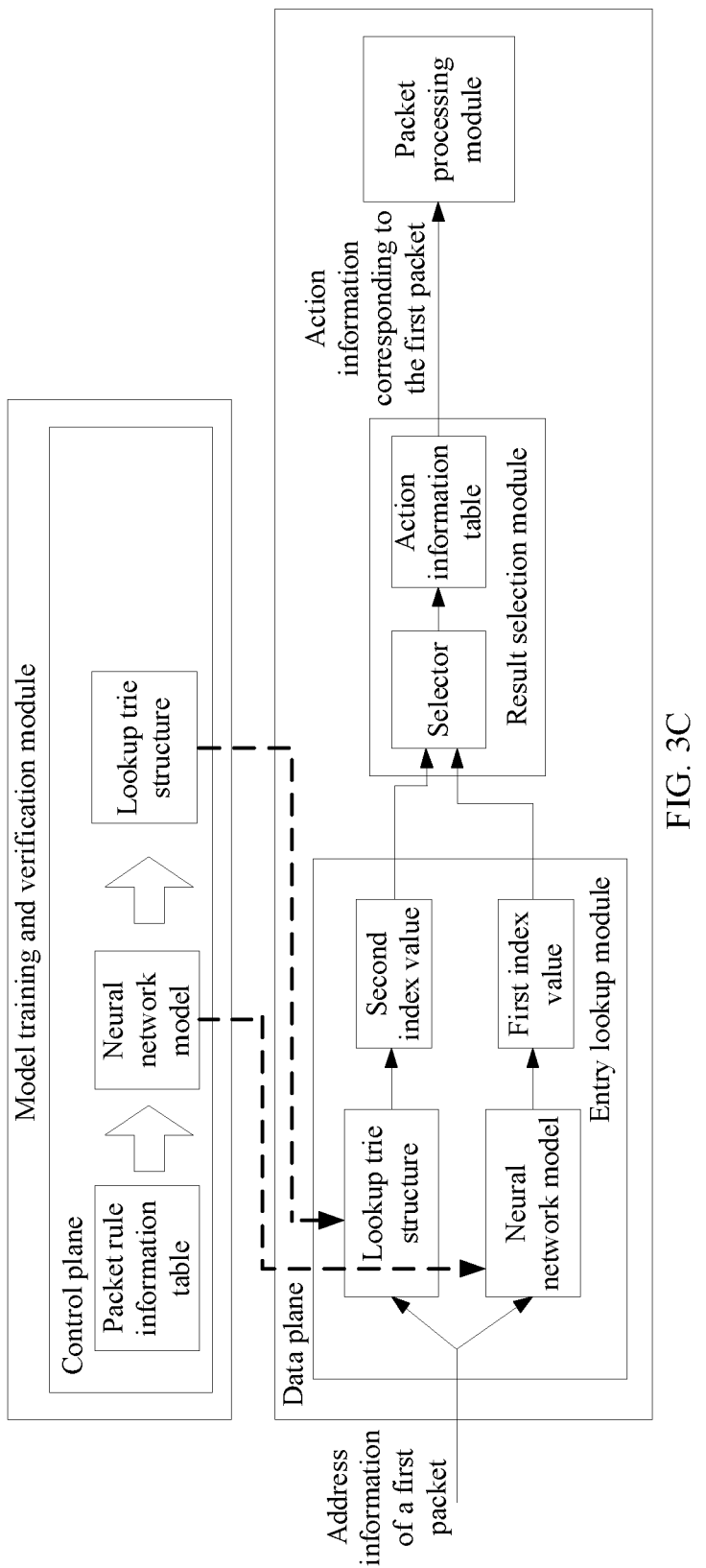
FIG. 3C is a schematic diagram of another scenario of a packet processing method according to an embodiment of this application.

The following describes the technical solution of this embodiment with reference to FIG. 3C. As shown in FIG. 3C, a model training and verification module in the network device performs model training based on the packet rule information table, to obtain the neural network model. The model training and verification module represents, as a corresponding lookup trie structure by using the lookup trie algorithm, the entry that cannot be fitted by using the neural network model.

An entry lookup module in the network device receives the first packet, and then inputs the address information of the first packet into the neural network model and the lookup trie structure in parallel, to obtain the first index value and the second index value respectively. A result selection module in the network device selects the first target index value from the first index value and the second index value, and determines, from the action information table based on the first target index value, the action information corresponding to the first packet. Then, a packet processing module in the network device processes the first packet based on the action information corresponding to the first packet. It can be learned from the example shown in FIG. 3C that steps 302 and 303 may be performed in parallel.

It should be noted that, in FIG. 2C, the lookup trie structure in step 304 may be stored in a chip. The lookup trie structure is a lookup trie structure corresponding to the entry that cannot be fitted by using the neural network model. Therefore, the technical solution of this application can compress an existing large-scale lookup trie structure, reduce storage overheads of the lookup trie structure in the network device, and effectively enhance a forwarding capacity.

In addition, the existing large-scale lookup trie structure cannot be completely stored in the chip. Therefore, a part of the lookup trie structure is stored outside the chip. In this case, an off-chip memory needs to be accessed when the packet is processed. Consequently, the off-chip memory is accessed for a large quantity of times, and specific bandwidth is needed for accessing the off-chip memory. However, in the technical solution of this application, the neural network model and the lookup trie structure may be stored in the chip. In this case, when an index value is determined, only an on-chip memory needs to be accessed, and the off-chip memory is not accessed. This reduces bandwidth for accessing the off-chip memory, and effectively enhances a forwarding capacity.

305: The network device determines, from the action information table based on the first target index value, the action information corresponding to the first packet.

306: The network device processes the first packet based on the action information corresponding to the first packet.

Steps 305 and 306 are similar to steps 203 and 204 in the foregoing embodiment shown in FIG. 2A. For details, refer to related descriptions of the embodiment shown in FIG. 2A. Details are not described herein.

The embodiment shown in FIG. 3A shows a solution in which the network device separately inputs the address information of the first packet into the neural network model and the lookup trie structure to obtain a corresponding index value. It should be noted that, if no result is returned after the network device separately inputs the address information of the first packet into the neural network model and the lookup trie structure, it indicates that the address information of the first packet does not match any prefix in the packet rule information table. If the network device inputs the address information of the first packet into the neural network model, the first index value is obtained. However, if the network device inputs the address information of the first packet into the lookup trie structure, no result is returned. In this case, the network device uses the first index value as a finally obtained index value. If the network device inputs the address information of the first packet into the neural network model, no result is returned. However, if the network device inputs the address information of the first packet into the lookup trie structure, the second index value is obtained. In this case, the network device uses the second index value as the finally obtained index value. Details may be represented in Table 8.

TABLE 8

| Neural network (NN) model and lookup trie structure (Lookup_Trie) | <0, 0> | <1, 0> | <0, 1> | <1, 1> |
|---|---|---|---|---|
| Select select | NULL | index_NN | index_lookup | index_NN (mask_NN > mask_lookup) index_lookup (mask_NN < mask_lookup) |

In Table 8, <0,0> indicates that neither the neural network model nor the lookup trie structure returns a result. This indicates that the address information of the first packet does not match any prefix in the packet rule information table.

<1,0> indicates that the neural network model outputs index_NN, but the lookup trie structure returns no result. In this case, the network device uses index_NN as the finally obtained index value.

<0,1> indicates that the neural network model returns no result, but the lookup trie structure returns index lookup. In this case, the network device uses index lookup as the finally obtained index value.

<1,1> indicates that the neural network model outputs index_NN and the lookup trie structure returns index lookup. In this case, if a mask length mask_NN of an entry corresponding to index_NN is longer than a mask length mask lookup of an entry corresponding to index lookup, the network device uses index_NN as the finally obtained index value. If the mask length mask_NN of the entry corresponding to index_NN is shorter than or equal to the mask length mask lookup of the entry corresponding to index lookup, the network device uses index lookup as the finally obtained index value.

In this embodiment of this application, the network device determines the first index value based on the address information of the first packet and the neural network model. The network device determines the second index value based on the address information of the first packet and the lookup trie structure. Then, the network device determines the first target index value from the first index value and the second index value, and determines, from the action information table based on the first target index value, the action information corresponding to the first packet. The network device processes the first packet based on the action information corresponding to the first packet. In this application, in general, 90% of the entries in the packet rule information table may be fitted by using the neural network model, and a small quantity of entries in the packet rule information table cannot be fitted. Therefore, the network device only needs to store a lookup trie structure corresponding to the entries that cannot be fitted by using the neural network model. Therefore, the technical solution of this application can compress an existing large-scale lookup trie structure, reduce storage overheads of the lookup trie structure in the network device, and effectively enhance a forwarding capacity. In addition, compared with a manner in which the network device determines an index value by using the large-scale lookup trie structure, a manner in which the network device determines the first index value based on the address information of the first packet and the neural network model is faster and has a shorter lookup delay.

In this embodiment of this application, optionally, after the network device obtains the first index value in step 202, the network device may perform error correction on the first index value, to subsequently determine corresponding action information for the first packet more accurately. The following describes this process with reference to the embodiment shown in FIG. 4A.

Refer to FIG. 4A. FIG. 4A is a schematic diagram of another embodiment of a packet processing method according to an embodiment of this application. In FIG. 4A, the packet processing method includes the following steps.

401: A network device obtains a first packet.

402: The network device determines a first index value based on address information of the first packet and a neural network model.

Steps 401 and 402 are similar to steps 201 and 202 in the embodiment shown in FIG. 2A. For details, refer to related descriptions of steps 201 and 202 in the embodiment shown in FIG. 2A. Details are not described herein.

403: The network device determines, from an error correction table, prefixes and masks corresponding to seventh entries.

The seventh entries include an entry that is in the error correction table and that corresponds to the first index value and an entry that is in the error correction table and that corresponds to an index value in a preset threshold range of the first index value.

The error correction table includes at least one entry, and each entry corresponds to an index value and has corresponding address information. The address information corresponding to each entry includes a prefix and a mask.

A quantity of entries included in the error correction table is the same as a quantity of entries included in a packet rule information table. In an example, the entries in the error correction table are in a one-to-one correspondence with the entries in the packet rule information table in order of index values. In other words, it may be understood that index values corresponding to the entries in the error correction table are the same as index values of corresponding entries in the packet information table. Address information corresponding to the entries in the error correction table is address information of the corresponding entries in the packet rule information table.

The error correction table and an action information table may be logically one table. In actual storage, content of the error correction table and content of the action information table may be stored in one table. This is not limited in this application.

For example, the packet rule information table is Table 1. The entries in the error correction table are in a one-to-one correspondence with the entries in the packet rule information table in order of index values. The address information corresponding to the entries in the error correction table is the address information of the corresponding entries in the packet rule information table. Therefore, the error correction table may be represented as the following Table 9.

TABLE 9

| Prefix prefix |
| --- |
| —/0 |
| 0/1 |
| 00/2 |
| 001/3 |
| 01/2 |
| 011/3 |

For example, the first index value is an index value 3 and corresponds to a 4th entry in Table 9. A preset threshold error bound is 2. In this case, fifth entries include a 2nd entry, a 3rd entry, the 4th entry, a 5th entry, and a 6th entry in Table 9. The network device determines, from Table 9, a prefix and a mask that correspond to each of the 2nd entry, the 3rd entry, the 4th entry, the 5th entry, and the 6th entry.

It should be noted that the preset threshold error bound may be configured by a user based on a configuration manual, or may be determined by the network device. This is not further limited in this application.

In this embodiment, at least one of the following factors may be considered in a value design of the preset threshold: the quantity of entries in the packet rule information table, a lookup delay requirement, and a model precision requirement.

A larger quantity of entries in the packet rule information table indicates a larger preset threshold. A higher lookup delay requirement indicates a smaller preset threshold. A higher model precision requirement indicates a smaller preset threshold.

404: The network device determines that a prefix corresponding to an eighth entry matches a destination address of the first packet, and that a mask corresponding to the eighth entry is a longest mask in the masks corresponding to the seventh entries.

For example, the seventh entries include the 2nd entry, the 3rd entry, the 4th entry, the entry, and the 6th entry in Table 9. First three high-order bits in the destination address of the first packet are 001. In this case, it can be learned from Table 9 that the prefix of the 4th entry is 001. Therefore, the network device determines that the prefix of the 4th entry matches the destination address of the first packet.

It should be noted that, in the foregoing example, only the prefix of the eighth entry in the seventh entries matches the destination address of the first packet. Therefore, the network device may directly select the eighth entry without comparing a mask length corresponding to the entry. If prefixes of a plurality of entries in the seventh entries match the destination address of the first packet, the network device needs to further determine mask lengths corresponding to the plurality of entries, and determine an entry with a maximum mask length as the eighth entry.

405: The network device determines a fourth index value corresponding to the eighth entry.

For example, if the eighth entry is the 4th entry in Table 9, the fourth index value is the index value 3.

Figure 4B:
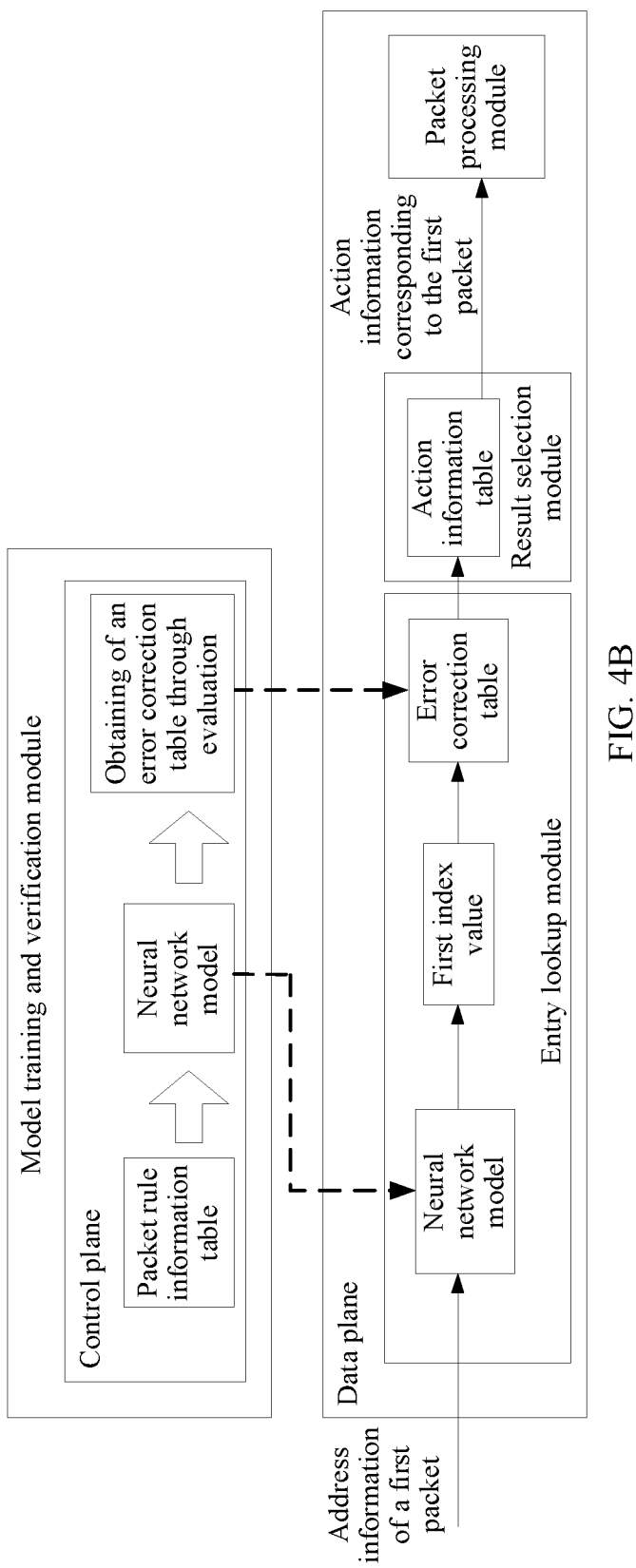
FIG. 4B is a schematic diagram of another scenario of a packet processing method according to an embodiment of this application.

The following describes the technical solution of this embodiment with reference to FIG. 4B. As shown in FIG. 4B, a model training and verification module in the network device is configured to perform model training based on the packet rule information table, to obtain the neural network model.

An entry lookup module in the network device receives the first packet, and inputs the address information of the first packet into the neural network model, to obtain the first index value. Then, the network device performs error correction on the first index value based on the error correction table, to obtain the fourth index value. A result selection module in the network device determines, from the action information table based on the fourth index value, action information corresponding to the first packet. Then, a packet processing module in the network device processes the first packet based on the action information corresponding to the first packet.

406: The network device determines, from the action information table based on the fourth index value, the action information corresponding to the first packet.

It can be learned from the related description of the first possible implementation in step 203 in the embodiment shown in FIG. 2A that, the quantity of entries in the packet rule information table is the same as a quantity of entries in the action information table, and the entries in the packet rule information table are in a one-to-one correspondence with the entries in the action information table in order of index values. In other words, it may be understood that the index values corresponding to the entries in the packet rule information table are the same as index values corresponding to corresponding entries in the action information table. It can be learned from the description of step 403 that the quantity of entries in the error correction table is the same as the quantity of entries in the packet rule information table, and that the entries in the error correction table are in a one-to-one correspondence with the entries in the packet rule information table. In other words, it may be understood that the index values corresponding to the entries in the error correction table are the same as the index values of the corresponding entries in the packet information table. Therefore, the fourth index value may be understood as an index value corresponding to a corresponding entry in the action information table.

407: The network device processes the first packet based on the action information corresponding to the first packet.

Steps 406 and 407 are similar to steps 203 and 204 in the embodiment shown in FIG. 2A. For details, refer to related descriptions of steps 203 and 204 in the embodiment shown in FIG. 2A. The details are not described herein.

In this embodiment of this application, the network device determines the first index value based on the address information of the first packet and the neural network model. Then, the network device performs error correction on the first index value based on the error correction table, to obtain the fourth index value. The network device determines, from the action information table based on the fourth index value, the action information corresponding to the first packet, and processes the first packet based on the action information corresponding to the first packet. It can be learned that the network device does not need to store a large-scale lookup trie structure, which avoids storage overheads caused by the lookup trie structure. Compared with a manner in which the network device determines, by using the lookup trie structure, the action information corresponding to the first packet, a manner in which the network device determines, by using the neural network model, the error correction table, and the action information table, the action information corresponding to the first packet is faster and has a shorter lookup delay. Further, the network device performs error correction on the first index value based on the error correction table to obtain the fourth index value, and then determines the action information corresponding to the first packet. In this way, corresponding action information for the first packet can be determined more accurately.

In this embodiment, optionally, as shown in FIG. 2D, the neural network model in the network device may be stored in a chip, and the action information table may be stored outside the chip. In this way, when processing the first packet, the network device only needs to access an on-chip memory, and does not need to access an off-chip memory. This reduces bandwidth for accessing the off-chip memory, and effectively enhances a forwarding capacity.

The following describes a detailed procedure of the following technical solution with reference to an embodiment shown in FIG. 5A. In the technical solution, a network device obtains a fifth index value based on address information of a first packet, a neural network model, and an error correction table. Then, the network device determines a sixth index value based on the address information of the first packet and a lookup trie structure. With reference to the fifth index value and the sixth index value, the network device finally determines action information corresponding to the first packet.

Refer to FIG. 5A. FIG. 5A is a schematic diagram of another embodiment of a packet processing method according to an embodiment of this application. In FIG. 5A, the packet processing method includes the following steps.

501: A network device obtains a first packet.

502: The network device determines a first index value based on address information of the first packet and a neural network model.

Steps 501 and 502 are similar to steps 201 and 202 in the embodiment shown in FIG. 2A. For details, refer to related descriptions of steps 201 and 202 in the embodiment shown in FIG. 2A. The details are not described herein.

503: The network device determines, from an error correction table, prefixes and masks corresponding to ninth entries.

The ninth entries include an entry that is in the error correction table and that corresponds to the first index value and an entry that is in the error correction table and that corresponds to an index value in a preset threshold range of the first index value.

504: The network device determines that a prefix corresponding to a tenth entry matches a destination address of the first packet, and that a mask corresponding to the tenth entry is a longest mask in the masks corresponding to the ninth entries.

505: The network device determines a fifth index value corresponding to the tenth entry.

Steps 503 to 505 are similar to steps 403 to 405 in the embodiment shown in FIG. 4A. For details, refer to related descriptions of steps 403 to 405 in the embodiment shown in FIG. 4A. The details are not described herein.

506: The network device determines a sixth index value based on the address information of the first packet and a lookup trie structure.

507: The network device determines a second target index value from the fifth index value and the sixth index value.

508: The network device determines, from an action information table based on the second target index value, action information corresponding to the first packet.

509: The network device processes the first packet based on the action information corresponding to the first packet.

Steps 506 to 509 are similar to steps 303 to 306 in the embodiment shown in FIG. 3A. For details, refer to related descriptions of steps 303 to 306 in the embodiment shown in FIG. 3A. The details are not described herein.

Figure 5B:
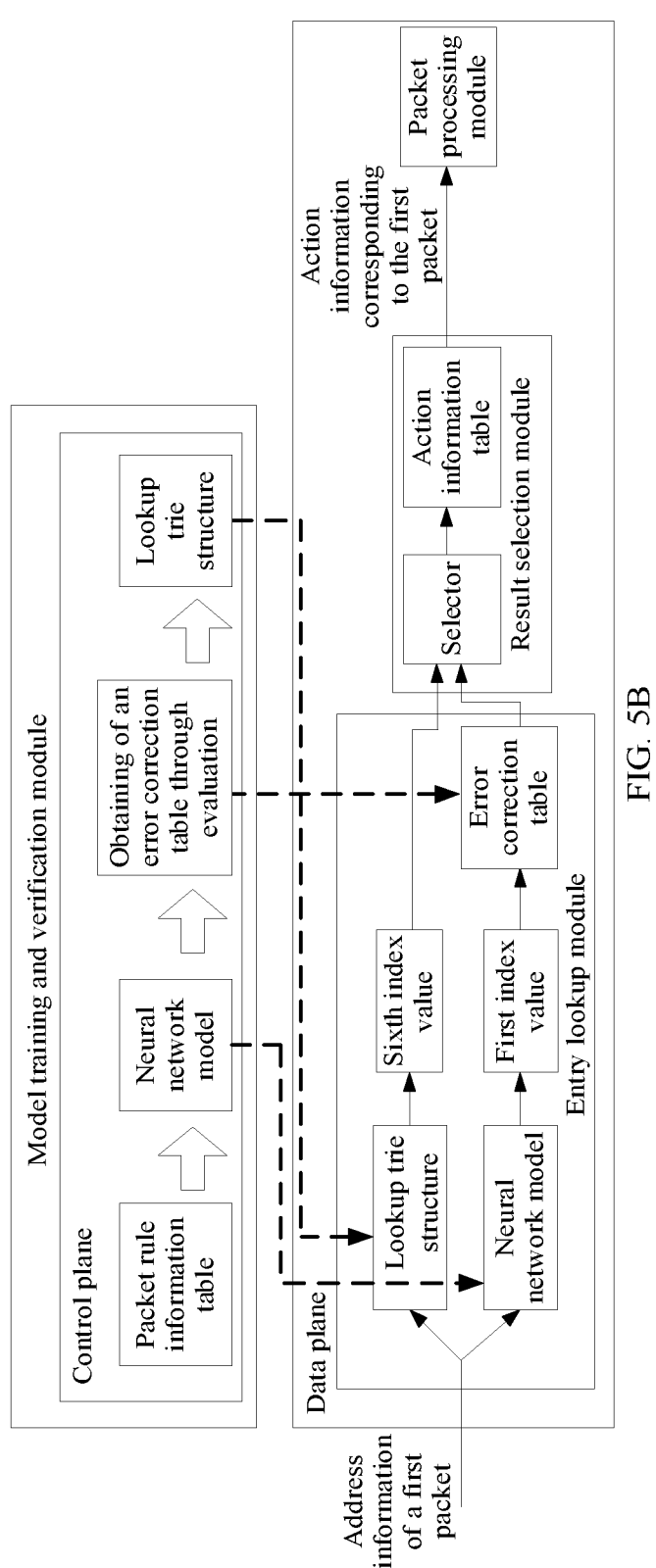
FIG. 5B is a schematic diagram of another scenario of a packet processing method according to an embodiment of this application.

The following describes a specific process of this embodiment with reference to FIG. 5B.

A model training and verification module in the network device is configured to perform model training based on a packet rule information table, to obtain the neural network model, and represent, as a corresponding lookup trie structure based on a lookup trie algorithm, an entry that cannot be fitted by using the neural network model.

An entry lookup module receives the first packet. The entry lookup module inputs the address information of the first packet into the neural network model and the lookup trie structure in parallel, to obtain the first index value and the sixth index value. The entry lookup module performs error correction on the first index value based on the error correction table, to obtain the fifth index value. A result selection module in the network device selects the second target index value from the fifth index value and the sixth index value, and determines, from the action information table based on the second target index value, the action information corresponding to the first packet. A packet processing module in the network device processes the first packet based on the action information corresponding to the first packet.

In this embodiment of this application, the network device determines the first index value based on the address information of the first packet and the neural network model, and performs error correction on the first index value based on the error correction table, to obtain the fifth index value. The network device determines the sixth index value based on the address information of the first packet and the lookup trie structure. Then, the network device selects the second target index value from the fifth index value and the sixth index value, and determines, from the action information table based on the second target index value, the action information corresponding to the first packet. Subsequently, the packet processing module in the network device processes the first packet based on the action information corresponding to the first packet. The lookup trie structure is a lookup trie structure corresponding to the entry that cannot be fitted by using the neural network model. Therefore, the technical solution of this application can compress an existing large-scale lookup trie structure, reduce storage overheads of the lookup trie structure in the network device, and effectively enhance a forwarding capacity. Compared with a manner in which the network device determines an index value by using the large-scale lookup trie structure, a manner in which the network device determines a fourth index value by using the neural network model, the error correction table, and the action information table is faster and has a shorter lookup delay. In addition, the network device may further perform error correction on the first index value based on the error correction table, to obtain the fifth index value. Then, with reference to the fifth index value and the sixth index value, the network device determines the action information corresponding to the first packet. In this way, the action information for the first packet is determined more effectively and more accurately, and the first packet is processed more accurately.

In embodiments of this application, optionally, before step 202 in the embodiment shown in FIG. 2A, step 302 in the embodiment shown in FIG. 3A, step 402 in the embodiment shown in FIG. 4A, or step 502 in the embodiment shown in FIG. 5A is performed, the network device may perform model training based on the packet rule information table, to obtain the neural network model. The following describes a training process with reference to FIG. 6A.

Figure 6A:
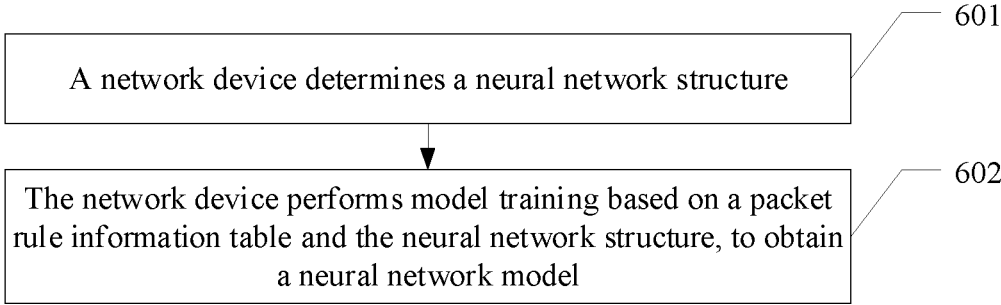
FIG. 6A is a schematic diagram of another embodiment of a packet processing method according to an embodiment of this application.

Refer to FIG. 6A. FIG. 6A is a schematic diagram of another embodiment of a packet processing method according to an embodiment of this application. In FIG. 6A, the packet processing method includes the following steps.

601: A network device determines a neural network structure.

The neural network structure may be a hierarchical structure or a non-hierarchical structure. This is not limited in this application.

The following uses an example in which the neural network structure is the hierarchical structure for description.

Figure 6B:
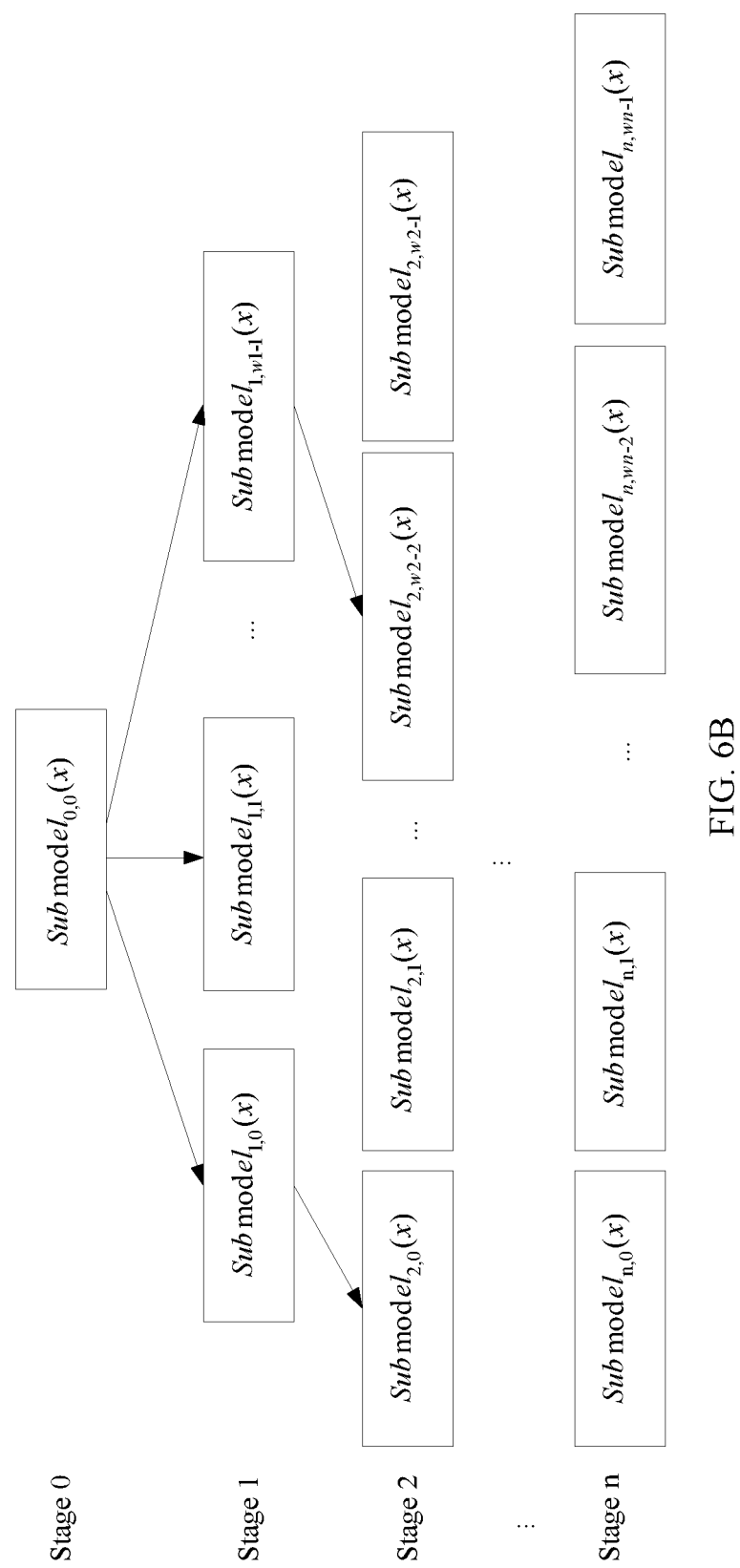
FIG. 6B is a schematic diagram of a structure of a neural network model according to an embodiment of this application.

For example, as shown in FIG. 6B, the neural network structure is the hierarchical structure. The network device determines a height H and a width W of the neural network structure, and a quantity of micromodels included in the neural network structure. Each micromodel may be represented by using an ReLU activation function, so that the neural network model may be represented by using a piecewise linear function.

It should be noted that the width and the height of the neural network structure and the quantity of micromodels in the neural network structure may be configured by a user based on a configuration manual, or may be configured by the network device. Details are not described herein. The height of the neural network structure and the quantity of micromodels in the neural network structure may be set based on a scenario requirement.

For example, in a delay-sensitive scenario, the neural network structure may have a small width but include a large quantity of micromodels. In this case, storage for the neural network model in the network device is large, but a delay in performing retrieval by the network device by using the neural network model is small. For example, the scenario is a data center network.

For example, in a scenario with a high storage requirement, the neural network structure may have a small width and include a small quantity of micromodels. In this case, storage for the neural network model in the network device is small, but a delay in performing retrieval by the network device by using the neural network model is large. For example, the scenario is a wide area network scenario.

Therefore, in actual application, the width and the height of the neural network structure and the quantity of micromodels in the neural network structure may be set based on an actual requirement.

602: The network device performs model training based on a packet rule information table and the neural network structure, to obtain the neural network model.

For example, in a neural network structure shown in FIG. 6B, the network device may sample an Internet Protocol (IP) address in an entire IP address space, to obtain a first sampled IP address. The network device determines, based on the foregoing packet rule information table shown in Table 1, an index value corresponding to the first sampled IP address. Then, the network device trains a micromodel in a first stage (that is, a stage 0) in the neural network structure based on the first sampled IP address and the index value corresponding to the first sampled IP address, for example, a micromodel $Submodel_{0,0}$ (x) in the first stage in the neural network structure shown in FIG. 6B. The micromodel may be represented by using a rectified linear unit (ReLU) activation function. In this case, specific values of coefficients in the ReLU activation function are mainly obtained in a training process, and the values of the coefficients may be referred to as parameters of the micromodel.

After the micromodel in the first stage is converged, the network device obtains, based on an output of the micromodel in the first stage, an IP address range managed by each micromodel in a second stage (that is, a stage 1). The network device samples an IP address from the IP address range managed by each micromodel in the second stage, to obtain a second sampled IP address. The network device determines, based on the packet rule information table, an index value corresponding to the second sampled IP address. Then, the network device trains each micromodel in the second stage in the neural network structure based on the second sampled IP address and the index value corresponding to the second sampled IP address.

A training process of a micromodel in another stage in the neural network structure is similar, and is not described herein. The network device trains micromodels in all stages of the neural network model based on the foregoing implementation, to obtain parameters of the micromodels. Then, the network device determines the neural network model based on the parameters of the micromodels and the neural network structure.

Steps 601 and 602 may be performed by a control plane of the network device, for example, may be performed by a central processing unit (CPU) of the network device or an AI chip integrated into the network device. This is not limited in this application.

It should be noted that, when the network device is started for a first time, the network device may perform processes of steps 601 and 602 to obtain the neural network model. Alternatively, when a large quantity of entries in the packet rule information table in the network device are updated, the network device may perform the processes of steps 601 and 602 to obtain a latest neural network model.

There is a plurality of scenarios in which a large quantity of entries in the packet rule information table in the network device are updated. For example, in a data communication network system, communication cannot be performed on a node due to a node fault or another reason. Consequently, a forwarding path cannot be used. In this scenario, the forwarding path needs to be changed, and action information corresponding to an entry in the packet rule information table changes. Therefore, the entry in the packet rule information table needs to be updated.

It should be noted that, in step 304a in the embodiment shown in FIG. 3A, if the neural network model further outputs a mask length corresponding to an index value, the network device further needs to use, as training data when training the neural network model, a mask length corresponding to an entry that matches a sampled IP address. In other words, the network device performs training based on the sampled IP address, an index value corresponding to the sampled IP address, and the mask length corresponding to the sampled IP address, to obtain the neural network model.

Optionally, the control plane of the network device sends a first message to a data plane of the network device.

The first message is used to deliver or update the neural network model to the data plane of the network device.

Optionally, the first message includes a second packet. A packet header of the second packet includes an enable bit for the neural network model, a height of the neural network model, a width of the neural network model, and an identifier of a micromodel in the neural network model. A payload of the second packet includes a parameter of the neural network model. The enable bit for the neural network model takes a value of 1.

For example, as shown in FIG. 5B, the network device performs model training on the control plane to obtain the neural network model. The control plane of the network device sends the first message to the data plane of the network device, where the first message includes the second packet. For a format of the second packet, refer to FIG. 6C. In FIG. 6C, a packet header of the second packet includes an enable bit $NN_{enable}$ for the neural network model, a height $H_{NN}$ and a width $W_{NN}$ of the neural network model, and an identifier of a micromodel Submodel_ID in the neural network model.

The enable bit $NN_{enable}$ for the neural network model takes a value of 1, and is used to indicate that the second packet is used to indicate the neural network model to the data plane of the network device. For example, as shown in FIG. 6B, the height of the neural network model $H_{NN}$ takes a value of 3, and the width $W_{NN}$ of the neural network model takes a value of 512.

A payload of a first packet includes parameters of all micromodels.

For example, the Submodel_ID includes micromodel IDs corresponding to $Submodel_{0,0}$ (x), $Submodel_{1,0}$ (x), $Submodel_{1,1}$ (x), $Submodel_{1,2}$ (x), $Submodel_{1,3}$ (x), $Submodel_{1,4}$ (x), $Submodel_{1,5}$ (x), $Submodel_{1,6}$ (x), and $Submodel_{1,7}$ (x) w1 is an integer greater than or equal to 7. For example, a1, b1, c1, and d1 may be parameters of the micromodel $Submodel_{0,0}$ (x) shown in FIG. 6B. a2, b2, c2, and d2 may be parameters of the micromodel $Submodel_{1,0}$ (x) shown in FIG. 6B. The rest can be deduced by analogy.

It should be noted that, if a payload of one second packet cannot carry parameters of all micromodels shown in FIG. 6B, the first message may include a plurality of second packets. A format of a packet header of each second packet is similar to that of the packet header shown in FIG. 6C. A difference lies in that micromodel identifiers included in the packet header of the second packet are micromodel identifiers corresponding to micromodel parameters carried in the payload of the second packet.

For example, micromodel identifiers included in the packet header of the second packet shown in FIG. 6C are micromodel identifiers corresponding to $Submodel_{0,0}$ (x), $Submodel_{1,0}$ (x), $Submodel_{1,1}$ (x), $Submodel_{1,2}$ (x), $Submodel_{1,3}$ (x), $Submodel_{1,4}$ (x), $Submodel_{1,5}$ (x), $Submodel_{1,6}$ (x), and $Submodel_{1,4}$ (x). w1 is an integer greater than or equal to 7. The payload of the second packet includes parameters of these micromodels.

In this embodiment of this application, optionally, before step 303 in the embodiment shown in FIG. 3A is performed, the network device may determine a lookup trie structure. The following describes this process with reference to the embodiment shown in FIG. 7A.

Refer to FIG. 7A. FIG. 7A is a schematic diagram of another embodiment of a packet processing method according to an embodiment of this application. In FIG. 7A, the packet processing method includes the following steps.

701: A network device determines an entry that is in a packet rule information table and that cannot be fitted by using a neural network model.

702: The network device represents, based on a lookup trie algorithm, the entry that cannot be fitted by using the neural network model, to obtain a lookup trie structure.

For example, as shown in FIG. 5B, the network device determines the entry that cannot be fitted by using the neural network model, and constructs a residual table (remainder set) for the entry that cannot be fitted by using the neural network model. The network device represents, as the lookup trie structure based on the lookup trie algorithm, the entry included in the residual table. For steps 701 and 702, refer to a related description of step 303 in FIG. 3A. Details are not described herein.

Steps 701 and 702 may be performed by a control plane of the network device, for example, may be performed by a CPU of the network device, or an artificial intelligence (AI) chip integrated into the network device. This is not limited in this application.

It should be noted that, when the network device is started for a first time, the network device may perform processes of steps 701 and 702, to obtain the lookup trie structure. Alternatively, when a large quantity of entries in the packet rule information table in the network device are updated and an entry that cannot be fitted by using the neural network model changes, the network device may perform the processes of steps 701 and 702, to obtain a latest lookup trie structure. For a related description of a case in which a large quantity of entries in the packet rule information table are updated, refer to the foregoing related description.

Optionally, the control plane of the network device sends a second message to a data plane of the network device.

The second message is used to deliver or update the lookup trie structure to the data plane of the network device.

Optionally, the second message includes a third packet. A packet header of the third packet includes an enable bit for the lookup trie structure, a type of the lookup trie structure, an identifier of a start node to be updated in the lookup trie structure, and an identifier of an end node to be updated in the lookup trie structure. A payload of the third packet includes the lookup trie structure.

The enable bit for the lookup trie takes a value of 1.

For example, as shown in FIG. 5B, the network device determines, on the control plane, the entry that cannot be fitted by using the neural network model, and represents, by using the lookup trie algorithm, the entry that cannot be fitted by using the neural network model, to obtain the lookup trie structure. The control plane of the network device sends the second message to the data plane of the network device, where the first message includes the third packet. For a format of the third packet, refer to FIG. 7B. A packet header of the second packet includes an enable bit $Trie_{enable}$ for the lookup trie. $NN_{enable}$ takes a value of 1, and is used to indicate that the third packet is used to indicate the lookup trie structure to the data plane of the network device. A packet header of the second packet includes a type $Trie\_type$ of the lookup trie, an identifier $Node\_s$ of a start node to be updated, and an identifier $Node\_e$ of an end node to be updated in the lookup trie structure. A payload of the third packet includes the lookup trie structure lookup trie.

For example, in the lookup trie structure shown in FIG. 3B, the payload of the third packet includes two nodes and one edge. The edge is a right edge, and an index value on a node of the right edge is 1.

It should be noted that, if a payload of one third packet cannot carry related information of the lookup trie structure shown in FIG. 3B, the second message may include a plurality of third packets. A format of a packet header of each third packet is similar to that of the packet header shown in FIG. 7B, and the related information of the lookup trie structure is delivered by using payloads of the plurality of third packets.

In this embodiment of this application, optionally, in FIG. 4B or FIG. 5B, the control plane of the network device may determine an error correction table. Then, the control plane of the network device sends a third message to the data plane of the network device. The third message is used to deliver or update the error correction table to the data plane of the network device.

Figure 8:
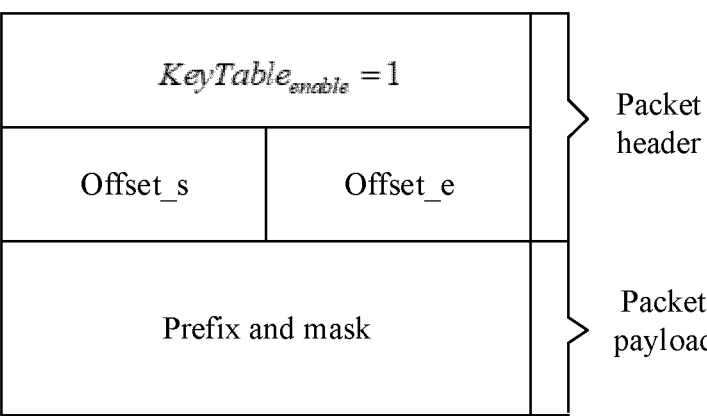
FIG. 8 is a schematic diagram of a format of a fourth packet according to an embodiment of this application.

Optionally, the third message includes a fourth packet. A packet header of the fourth packet includes an enable bit for the error correction table, and a start position and an end position for to-be-updated entries in the error correction table, where the enable bit for the error correction table takes a value of 1. A payload of the fourth packet includes prefixes and masks corresponding to the to-be-updated entries. For details, refer to a specific format of a fourth packet shown in FIG. 8.

For example, in the error correction table shown in Table 7, a start position that is for the to-be-updated entries and that is included in the packet header of the fourth packet indicates a 1st entry, and an end position that is for the to-be-updated entries and that is included in the packet header of the fourth packet indicates a 3rd entry. In other words, the fourth packet is used to deliver or update prefixes and masks included in first three entries in Table 7. In this case, the payload of the fourth packet includes a prefix and a mask in the 1st entry in Table 7, a prefix and a mask in a 2nd entry in Table 7, and a prefix and a mask in the 3rd entry in Table 7.

It should be noted that, if a payload of one fourth packet cannot carry prefixes and masks in all entries in the error correction table, the third message may include a plurality of fourth packets, and the prefixes and the masks in all entries in the error correction table are carried by using payloads of the plurality of fourth packets.

Figure 9:
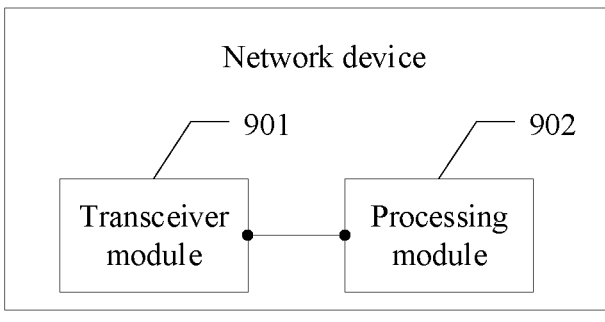
FIG. 9 is a schematic diagram of a structure of a network device according to an embodiment of this application.
Figure 10:
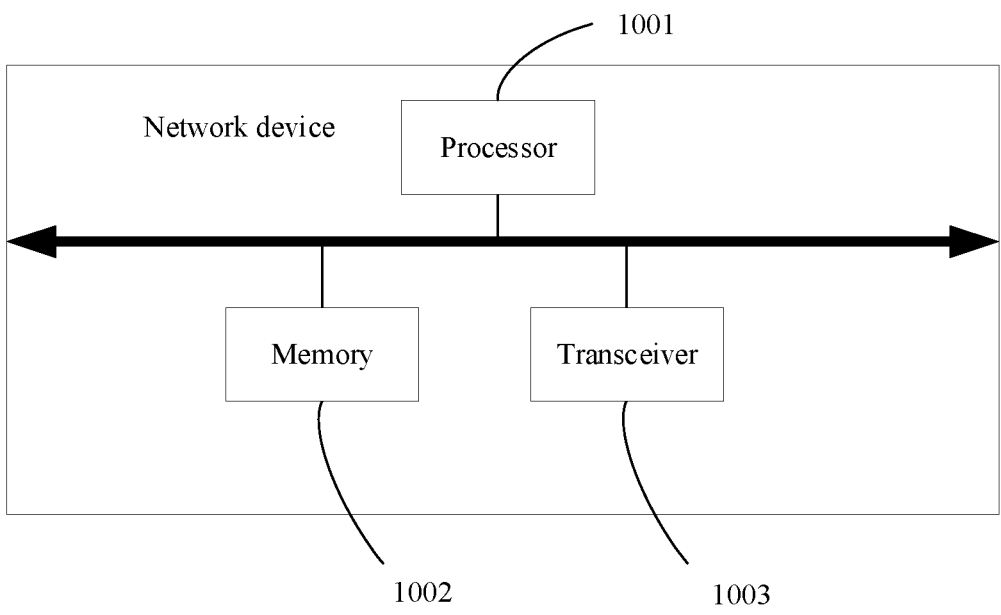
FIG. 10 is a schematic diagram of another structure of a network device according to an embodiment of this application.

The following describes a network device provided in an embodiment of this application with reference to FIG. 9 and FIG. 10.

Refer to FIG. 9. FIG. 9 is a schematic diagram of a structure of a network device according to an embodiment of this application. The network device may be the network device described in the foregoing method embodiments, or may be a chip or a component of the network device in the foregoing method embodiments. The network device may be configured to perform some or all of the steps performed by the network device in the foregoing method embodiments.

As shown in FIG. 9, the network device includes a transceiver module 901 and a processing module 902.

The transceiver module 901 is configured to obtain a first packet.

The processing module 902 is configured to determine a first index value based on address information of the first packet and a neural network model, determine, from an action information table based on the first index value, action information corresponding to the first packet, where the action information table includes at least one entry, and each entry corresponds to an index value and a piece of action information, and process the first packet based on the action information corresponding to the first packet.

In a possible implementation, the processing module 902 is further configured to determine a second index value based on the address information of the first packet and a lookup trie structure, where the lookup trie structure is a lookup trie structure corresponding to an entry that is in a packet rule information table and that cannot be fitted by using the neural network model, and determine a first target index value from the first index value and the second index value.

The processing module 902 is further configured to determine, from the action information table based on the first target index value, the action information corresponding to the first packet.

In another possible implementation, the neural network model is obtained by performing model training based on the packet rule information table.

In another possible implementation, the packet rule information table includes at least one entry, each entry corresponds to an index value and a piece of action information, and the action information table is used to indicate action information corresponding to each entry in the packet rule information table.

In another possible implementation, a first entry in the packet rule information table corresponds to a second entry in the action information table, the first entry and the second entry each include one or more entries, an index value corresponding to the first entry is the same as an index value corresponding to the second entry, and the index value corresponding to the second entry includes the first index value.

In another possible implementation, the processing module 902 is further configured to determine a third index value based on the address information of the first packet and the neural network model, where the third index value is an index value corresponding to a third entry in the packet rule information table, and determine, from a mapping table based on the third index value, the first index value corresponding to a fourth entry in the action information table, where the fourth entry is an entry that is in the action information table and that corresponds to the third entry, and the mapping table includes an index value of an entry that is in the action information table and that corresponds to each entry in the packet rule information table.

In another possible implementation, the processing module 902 is further configured to determine a mask length corresponding to the first index value and a mask length corresponding to the second index value, and select the first index value as the first target index value if the mask length corresponding to the first index value is longer than the mask length corresponding to the second index value, or select the second index value as the first target index value if the mask length corresponding to the first index value is shorter than the mask length corresponding to the second index value.

In another possible implementation, the processing module 902 is further configured to determine that the first index value corresponds to a fifth entry in an error correction table and that the second index value corresponds to a sixth entry in the error correction table, where the error correction table includes at least one entry, each entry corresponds to an index value and a priority, and entries in the error correction table are in a one-to-one correspondence with entries in the packet rule information table in order of index values, and each entry in the packet rule information table corresponds to a priority, and a priority corresponding to each entry in the error correction table is the same as a priority of a corresponding entry in the packet rule information table, determine, based on the error correction table, a priority corresponding to the fifth entry and a priority corresponding to the sixth entry, and select the first index value as the first target index value if the priority corresponding to the fifth entry is higher than the priority corresponding to the sixth entry, or select the second index value as the first target index value if the priority corresponding to the fifth entry is lower than the priority corresponding to the sixth entry.

In another possible implementation, the processing module 902 is further configured to determine, from an error correction table, prefixes and masks corresponding to seventh entries, where the error correction table includes at least one entry, each entry corresponds to an index value and has corresponding address information, the address information corresponding to each entry includes a prefix and a mask, and the seventh entries include an entry that is in the error correction table and that corresponds to the first index value and an entry that is in the error correction table and that corresponds to an index value in a preset threshold range of the first index value, determine that a prefix corresponding to an eighth entry in the seventh entries matches a destination address of the first packet, where a mask corresponding to the eighth entry is a longest mask in the masks corresponding to the seventh entries, and determine a fourth index value corresponding to the eighth entry.

The processing module 902 is further configured to determine, from the action information table based on the fourth index value, the action information corresponding to the first packet.

In another possible implementation, the processing module 902 is further configured to determine, from an error correction table, prefixes and masks corresponding to ninth entries, where the error correction table includes at least one entry, each entry corresponds to an index value and has corresponding address information, the address information corresponding to each entry includes a prefix and a mask, and the ninth entries include an entry that is in the error correction table and that corresponds to the first index value and an entry that is in the error correction table and that corresponds to an index value in a preset threshold range of the first index value, determine that a prefix corresponding to a tenth entry in the ninth entries matches a destination address of the first packet, where a mask corresponding to the tenth entry is a longest mask in the masks corresponding to the ninth entries, determine a fifth index value corresponding to the tenth entry, determine a sixth index value based on the address information of the first packet and a lookup trie structure, where the lookup trie structure is a lookup trie structure corresponding to an entry that is in a packet rule information table and that cannot be fitted by using the neural network model, and determine a second target index value from the fifth index value and the sixth index value.

The processing module 902 is further configured to determine, from the action information table based on the second target index value, the action information corresponding to the first packet.

In another possible implementation, the action information corresponding to the first packet includes port information, and the processing module 902 is further configured to determine a next-hop routing node of the first packet based on the port information, and forward the first packet to the next-hop routing node.

In another possible implementation, the processing module 902 is further configured to determine a neural network structure, and perform training based on the packet rule information table and the neural network structure, to obtain the neural network model, where the packet rule information table includes at least one entry, each entry corresponds to an index value and a piece of action information, and the action information table is used to indicate the action information corresponding to each entry in the packet rule information table.

In another possible implementation, a control plane of the network device sends a first message to a data plane of the network device, where the first message is used to deliver or update the neural network model to the data plane of the network device.

In another possible implementation, the first message includes a second packet. A packet header of the second packet includes an enable bit for the neural network model, a height of the neural network model, a width of the neural network model, and an identifier of a micromodel in the neural network model, where the enable bit for the neural network model takes a value of 1. A payload of the second packet includes a parameter of the neural network model.

In another possible implementation, the processing module 902 is further configured to determine the entry that is in the packet rule information table and that cannot be fitted by using the neural network model, where the packet rule information table includes at least one entry, each entry corresponds to an index value and a piece of action information, and the action information table is used to indicate the action information corresponding to each entry in the packet rule information table, and represent, based on a lookup trie algorithm, the entry that cannot be fitted by using the neural network model, to obtain the lookup trie structure.

In another possible implementation, the control plane of the network device sends a second message to the data plane of the network device, where the second message is used to deliver or update the lookup trie structure to the data plane of the network device.

In another possible implementation, the second message includes a third packet. A packet header of the third packet includes an enable bit for the lookup trie, a type of the lookup trie structure, an identifier of a start node to be updated in the lookup trie structure, and an identifier of an end node to be updated in the lookup trie structure, where the enable bit for the lookup trie takes a value of 1. A payload of the third packet includes the lookup trie structure.

In another possible implementation, the control plane of the network device sends a third message to the data plane of the network device, where the third message is used to deliver or update the error correction table to the data plane of the network device.

In another possible implementation, the third message includes a fourth packet. A packet header of the fourth packet includes an enable bit for the error correction table, and a start position and an end position for to-be-updated entries in the error correction table, where the enable bit for the error correction table takes a value of 1. A payload of the fourth packet includes prefixes and masks corresponding to the to-be-updated entries.

In this embodiment of this application, the transceiver module 901 is configured to obtain the first packet. The processing module 902 is configured to determine the first index value based on the address information of the first packet and the neural network model, determine, from the action information table based on the first index value, the action information corresponding to the first packet, where the action information table includes at least one entry, and each entry corresponds to an index value and a piece of action information, and process the first packet based on the action information corresponding to the first packet. Therefore, the network device does not need to store a large-scale lookup trie structure, which avoids storage overheads caused by the lookup trie structure. In addition, compared with a manner in which the network device determines, by using the lookup trie structure, the action information corresponding to the first packet, a manner in which the network device determines, by using the neural network model and the action information table, the action information corresponding to the first packet is faster and has a shorter lookup delay.

This application further provides a network device. Refer to FIG. 10, which is a schematic diagram of another structure of a network device according to an embodiment of this application. The network device may be configured to perform the steps performed by the network device in the embodiments shown in FIG. 2A, FIG. 3A, FIG. 4A, FIG. 5A, FIG. 6A, and FIG. 7A. For details, refer to related descriptions in the foregoing method embodiments.

The network device includes a processor 1001 and a memory 1002. Optionally, the network device further includes a transceiver 1003.

In a possible implementation, the processor 1001, the memory 1002, and the transceiver 1003 are separately connected by using a bus, and the memory stores computer instructions.

The transceiver module 901 in the foregoing embodiment may be the transceiver 1003 in this embodiment. Therefore, specific implementation of the transceiver 1003 is not described. The processing module 902 in the foregoing embodiment may be the processor 1001 in this embodiment. Therefore, specific implementation of the processor 1001 is not described.

An embodiment of this application further provides a computer program product including instructions. When the computer program product is run on a computer, the computer is enabled to perform the packet processing methods in the embodiments shown in FIG. 2A, FIG. 3A, FIG. 4A, FIG. 5A, FIG. 6A, and FIG. 7A.

An embodiment of this application further provides a computer-readable storage medium, including computer instructions. When the computer instructions are run on a computer, the computer is enabled to perform the communication methods in the embodiments shown in FIG. 2A, FIG. 3A, FIG. 4A, FIG. 5A, FIG. 6A, and FIG. 7A.

An embodiment of this application further provides a chip apparatus, including a processor, connected to a memory and configured to invoke a program stored in the memory, so that the processor performs the packet processing methods in the embodiments shown in FIG. 2A, FIG. 3A, FIG. 4A, FIG. 5A, FIG. 6A, and FIG. 7A.

The processor mentioned anywhere above may be a general-purpose CPU, a microprocessor, an application-specific integrated circuit (ASIC), or one or more integrated circuits configured to control program execution of the packet processing methods in the embodiments shown in FIG. 2A, FIG. 3A, FIG. 4A, FIG. 5A, FIG. 6A, and FIG. 7A. The memory mentioned anywhere above may be a read-only memory (ROM), another type of static storage device that can store static information and instructions, a random-access memory (RAM), or the like.

It may be clearly understood by a person skilled in the art that, for the purpose of convenient and brief description, for detailed working processes of the foregoing system, apparatus, and unit, refer to corresponding processes in the foregoing method embodiments, and details are not described herein.

In the several embodiments provided in this application, it can be understood that the disclosed system, apparatus, and method may be implemented in other manners. For example, the described apparatus embodiments are merely examples. For example, division into the units is merely logical function division. In actual implementation, another division manner may be used. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, for example, a Universal Serial Bus (USB) flash drive, a removable hard disk, a ROM, a RAM, a magnetic disk, or an optical disc.

In conclusion, the foregoing embodiments are used to describe the technical solutions of this application, but are not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, comprising:

obtaining, by a network device, a first packet comprising address information;

identifying, by the network device based on the address information and a neural network model, a first index value;

identifying, by the network device from an action information table based on the first index value, first action information corresponding to the first packet, wherein the action information table comprises a first entry corresponding to the first index value and a piece of the first action information;

identifying, by the network device based on the address information and a lookup trie structure, a second index value, wherein the lookup trie structure comprises a second entry that is in a packet rule information table and that cannot be fitted using the neural network model;

identifying, by the network device from the first index value and the second index value, a first target index value;

further identifying, by the network device from the action information table based on the first target index value, the first action information; and processing, by the network device based on the first action information, the first packet.

2. The method of claim 1, further comprising obtaining, by the network device, the neural network model by performing model training based on the packet rule information table.

3. The method of claim 1, wherein the packet rule information table comprises a third entry corresponding to a third index value and a piece of second action information, and wherein the action information table indicates the second action information corresponding to the third entry.

4. The method of claim 1, wherein a third entry in the packet rule information table corresponds to a fourth entry in the action information table, wherein the third entry and the fourth entry comprises one or more entries, wherein one or more third index values corresponding to the third entry is the same as one or more fourth index values corresponding to the fourth entry, and wherein the one or more fourth index values comprises the first index value.

5. The method of claim 1, wherein identifying, the first index value comprises:

identifying, by the network device based on the address information and the neural network model, a third index value corresponding to a third entry in the packet rule information table; and further identifying, by the network device from a mapping table based on the third index value, the first index value corresponding to a fourth entry in the action information table, wherein the fourth entry corresponds to the third entry, and wherein the mapping table comprises a fourth index value of a fifth entry that is in the action information table and that corresponds to each entry in the packet rule information table.

6. The method of claim 1, wherein identifying the first target index value comprises:

identifying, by the network device, a first mask length corresponding to the first index value and a second mask length corresponding to the second index value;

selecting, by the network device, the first index value as the first target index value when the first mask length is longer than the second mask length; and selecting, by the network device, the second index value as the first target index value when the first mask length is shorter than the second mask length.

7. The method of claim 1, wherein identifying the first target index value comprises:

identifying, by the network device, that the first index value corresponds to a third entry in an error correction table and that the second index value corresponds to a fourth entry in the error correction table, wherein the error correction table comprises a fifth entry corresponding to a third index value and a first priority, wherein fifth entries in the error correction table are in a one-to-one correspondence with sixth entries in the packet rule information table in order of index values, wherein each of the sixth entries corresponds to a second priority, and wherein the first priority is the same as the second priority of a corresponding entry in the packet rule information table;

identifying, by the network device based on the error correction table, a third priority corresponding to the fifth entry and a fourth priority corresponding to the fourth entry;

selecting, by the network device, the first index value as the first target index value when the third priority is higher than the fourth priority; and selecting, by the network device, the third index value as the first target index value when the third priority is lower than the fourth priority.

8. The method of claim 1, further comprising:

identifying, by the network device from an error correction table, first prefixes and first masks corresponding to a third entry, wherein the error correction table comprises a fourth entry corresponding to the second index value and has corresponding address information, wherein the corresponding address information comprises a second prefix and a second mask, and wherein the third entry comprises a fifth entry that is in the error correction table and that corresponds to the first index value and a sixth entry that is in the error correction table and that corresponds to a fourth index value in a preset threshold range of the first index value;

identifying, by the network device, that a third prefix corresponding to a seventh entry of the third entry matches a destination address of the first packet, wherein a third mask corresponding to the sixth seventh entry is a longest mask in the first masks;

identifying, by the network device, a fifth index value corresponding to the seventh entry; and further identifying, from the action information table based on the fifth index value, the first action information.

9. The method of claim 1, further comprising:

identifying, by the network device from an error correction table, first prefixes and first masks corresponding to a third entry, wherein the error correction table comprises a fourth entry corresponding to the second index value and has corresponding address information, wherein the corresponding address information comprises a second prefix and a second mask, and wherein the third entry comprise a fifth entry that is in the error correction table and that corresponds to the first index value and a sixth entry that is in the error correction table and that corresponds to a fourth index value in a preset threshold range of the first index value;

identifying that a third prefix corresponding to a seventh entry in the third entry matches a destination address of the first packet, wherein a third mask corresponding to the seventh entry is a longest mask in the first masks;

identifying, by the network device, a fifth index value corresponding to the seventh entry;

identifying, by the network device based on the address information and the lookup trie structure, a sixth index value, wherein the lookup trie structure corresponds to an eighth entry that is in the packet rule information table and that cannot be fitted using the neural network model;

identifying, by the network device from the fifth index value and the sixth index value, the first target index value; and further identifying, by the network device from the action information table based on the first target index value, the first action information.

10. The method of claim 8, wherein fifth entries in the error correction table are in a one-to-one correspondence with sixth entries in the packet rule information table in order of index values, wherein second address information corresponding to the fifth entries correspond to corresponding entries in the packet rule information table, wherein the packet rule information table comprises an eighth entry corresponding to a seventh index value and a piece of second action information, and corresponding third address information, and wherein the action information table indicates third action information corresponding to the eighth entry.

11. The method of claim 1, wherein the first action information comprises port information, and wherein the method further comprises:

identifying, by the network device based on the port information, a next-hop routing node of the first packet; and forwarding, by the network device to the next-hop routing node, the first packet.

12. The method of claim 1, wherein before identifying the first index value, the method further comprises:

identifying, by the network device, a neural network structure; and performing, by the network device based on the packet rule information table and the neural network structure, training to obtain the neural network model, wherein the packet rule information table comprises a third entry, corresponding to the second index value and a piece of second action information, and wherein the action information table indicates the second action information.

13. The method of claim 1, further comprising:

identifying, by the network device, a third entry that is in the packet rule information table and that cannot be fitted using the neural network model, wherein the packet rule information table comprises a fourth entry corresponding to a third index value and a piece of second action information, and wherein the action information table indicates the second action information; and representing, by the network device based on a lookup trie algorithm, the third entry to obtain the lookup trie structure.

14. A network device comprising:

a memory configured to store program instructions; and one or more processors coupled to the memory and configured to execute the program instructions to cause the network device to:

obtain a first packet comprising address information;

identify, based on the address information and a neural network model, a first index value;

identify, from an action information table based on the first index value, first action information corresponding to the first packet, wherein the action information table comprises a first entry corresponding to the first index value and a piece of second action information;

identify, based on the address information and a lookup trie structure, a second index value, wherein the lookup trie structure comprises a second entry that is in a packet rule information table and that cannot be fitted using the neural network model;

identify, from the first index value and the second index value, a first target index value;

further identify, from the action information table based on the first target index value, the first action information; and process, based on the first action information, the first packet.

15. The network device of claim 14, wherein the one or more processors is further configured to execute the program instructions to cause the network device to obtain, by performing model training based on the packet rule information table, the neural network model.

16. The network device of claim 14, wherein the packet rule information table comprises a third entry corresponding to a third index value and a piece of second action information, and wherein the action information table indicates the second action information corresponding to the third entry.

17. The network device of claim 14, wherein a third entry in the packet rule information table corresponds to a fourth entry in the action information table, wherein the third entry and the fourth entry comprises one or more entries, wherein one or more third index values corresponding to the third entry are the same as one or more fourth index values corresponding to the fourth entry, and wherein the one or more fourth index values comprise the first index value.

18. A computer program product comprising computer executable instructions stored on a non-transitory computer-readable storage medium and that, when executed by one or more processors, cause a network device to:

obtain a first packet comprising address information;

identify, based on the address information and a neural network model, a first index value;

identify, from an action information table based on the first index value, first action information corresponding to the first packet, wherein the action information table comprises a first entry corresponding to the first index value and a piece of the first action information;

identify, based on the address information and a lookup trie structure, a second index value, wherein the lookup trie structure comprises a second entry that is in a packet rule information table and that cannot be fitted using the neural network model;

identify, from the first index value and the second index value, a first target index value;

further identify, from the action information table based on the first target index value, the first action information; and process, based on the first action information, the first packet.

19. The computer program product of claim 18, wherein the computer executable instructions, when executed by the one or more processors, further cause the network device to:

identify a neural network structure; and perform, by the network device based on the packet rule information table and the neural network structure, training to obtain the neural network model, wherein the packet rule information table comprises a third entry, corresponding to the second index value and a piece of second action information, and wherein the action information table indicates the second action information.

20. The computer program product of claim 18, wherein the computer executable instructions, when executed by the one or more processors, further cause the network device to:

identify a third entry that is in the packet rule information table and that cannot be fitted using the neural network model, wherein the packet rule information table comprises a fourth entry corresponding to a third index value and a piece of second action information, and wherein the action information table indicates the second action information; and represent, by the network device based on a lookup trie algorithm, the third entry to obtain the lookup trie structure.

* * * * *